US012779373B2

(12) United States Patent
Orlic

(10) Patent No.: US 12,779,373 B2
(45) Date of Patent: Nov. 3, 2026

(54) FAUCET-MOUNTED WATER FILTER WITH ADJUSTABLE FILTERED WATER STREAM DIRECTION

(71) Applicant: Kristina Orlic, Naremburn (AU)

(72) Inventor: Kristina Orlic, Naremburn (AU)

(73) Assignee: Qure Holdings Pty Ltd, Sydney (AU)

( * ) Notice: Subject to any disclaimer, the term of this patent is extended or adjusted under 35 U.S.C. 154(b) by 383 days.

(21) Appl. No.: 18/735,466

(22) Filed: Jun. 6, 2024

(65) Prior Publication Data

US 2025/0296018 A1 Sep. 25, 2025

Related U.S. Application Data

(63) Continuation-in-part of application No. 29/933,684, filed on Mar. 21, 2024, now Pat. No. Des. 1,103,335.

(51) Int. Cl.

| | |
|---|---|
| ***B01D 27/10*** | (2006.01) |
| ***B01D 35/30*** | (2006.01) |
| ***C02F 1/00*** | (2023.01) |

(52) U.S. Cl.

CPC ......... *B01D 27/103* (2013.01); *B01D 35/306* (2013.01); *C02F 1/003* (2013.01); *C02F 2307/06* (2013.01); *E03C 2201/40* (2013.01)

(58) Field of Classification Search

CPC ........... C02F 2307/06; C02F 2201/006; B01D 35/306

See application file for complete search history.

(56) References Cited

U.S. PATENT DOCUMENTS

| | | | |
|---|---|---|---|
| 6,123,837 A | 9/2000 | Wadsworth | |
| 6,464,869 B1 | 10/2002 | Hsu | |
| 8,268,168 B2 * | 9/2012 | Mang | C02F 1/003 210/236 |
| 8,746,283 B2 | 6/2014 | Koury | |
| 11,440,813 B2 | 9/2022 | Tanner et al. | |
| 12,090,429 B1 * | 9/2024 | Su | B01D 39/1623 |
| 12,534,389 B2 * | 1/2026 | Ma | C02F 1/003 |
| 12,606,996 B2 * | 4/2026 | Gerner | E03C 1/0404 |
| 2015/0068987 A1 | 3/2015 | Bassett et al. | |
| 2023/0193605 A1 * | 6/2023 | Shin | B01D 29/03 4/619 |

FOREIGN PATENT DOCUMENTS

CN 221207099 U * 6/2024

* cited by examiner

*Primary Examiner* — Bradley R Spies
*Assistant Examiner* — Jeannie Mcdermott
(74) *Attorney, Agent, or Firm* — Boris Leschinsky

(57) ABSTRACT

A faucet-mounted water filter features a filtered water stream with an adjustable direction. It has a main body and an outlet body positioned as an extension thereof. The main body has an elongated cylindrical portion with the replaceable water filter cartridge inside thereof and an extension portion for attachment to a kitchen faucet. A planar edge of the main body is positioned at an inclination angle of between 45 degrees and less than 90 degrees to a longitudinal axis of the cylindrical portion. The outlet body has an outlet wall positioned at the same angle. The outlet body is rotatably mounted on the body water passage via a curved outlet water passage extending through the outlet body to the filtered water outlet. Rotation of the outlet body causes a change in the direction of the filtered water stream.

13 Claims, 26 Drawing Sheets

FAUCET-MOUNTED WATER FILTER WITH ADJUSTABLE FILTERED WATER STREAM DIRECTION

CROSS-REFERENCE DATA

This patent application is a continuation-in-part of and claims a priority date benefit from a co-pending US Design patent application Ser. No. 29/933,684 filed on Mar. 21, 2024 entitled "Water filter," which is incorporated herein in its entirety by reference.

BACKGROUND

Without limiting the scope of the invention, its background is described in connection with water filters. More particularly, the invention describes a water filter that may be attached to a conventional faucet and includes a replaceable water filter cartridge.

A conventional water filter designed for attachment to a typical kitchen faucet is broadly known. It may typically comprise a compact housing unit constructed from durable, food-grade materials, such as ABS plastic or stainless steel. This housing may encase a replaceable water filter cartridge, which is the core component responsible for purifying tap water. The attachment mechanism usually features a threaded adapter that securely fits onto the standard threads found on most kitchen faucets, providing a reliable seal to prevent leaks.

The replaceable cartridge inside the housing may be engineered to reduce contaminants through a combination of physical and chemical filtration methods. It often includes a pre-filter layer made of activated carbon and a micron filter made from materials like polypropylene. The activated carbon is effective in adsorbing chlorine, volatile organic compounds (VOCs), and odors, enhancing the taste and smell of the water. The micron filter layer is crucial for trapping particles, sediments, and potentially harmful microorganisms, ensuring the water's safety and clarity.

Furthermore, some advanced cartridges incorporate ion exchange resins or additional specialized media to target specific contaminants like lead, mercury, or pesticides, tailored to varying water quality needs. The design of the filter allows for easy access to the cartridge, typically via a twist-off cap or a simple snap mechanism, facilitating straightforward replacement without the need for tools. This ensures maintenance is user-friendly and can be conducted regularly to maintain optimal filtration performance. The overall design of the water filter is engineered for minimal disruption to kitchen aesthetics and ergonomics, often featuring a low-profile and unobtrusive look.

Some water filter designs provide a dual-stream feature, designed to offer users the flexibility to switch between filtered and unfiltered water, enhancing convenience and extending the life of the filter cartridge. This functionality is typically managed through a diverter valve integrated into the filter housing or the attachment mechanism that connects the filter to the faucet. The diverter is commonly operated via a lever, knob, or switch located on the side or top of the housing unit, making it easily accessible and simple to use. When the diverter is engaged, water is directed through the filter cartridge, undergoing purification before exiting the faucet. When switched to the unfiltered mode, the diverter bypasses the cartridge, allowing tap water to flow directly through the faucet without filtration. This option is particularly useful for tasks that do not require filtered water, such as washing dishes or general cleaning, thereby conserving the filter's effectiveness for the times when it is needed for drinking or cooking. The seamless operation of this feature ensures that users can effortlessly select the desired water stream according to their immediate needs, all while maintaining a streamlined and efficient water usage experience.

Despite the utility and convenience of kitchen faucet water filters, there are several limitations and drawbacks associated with their use. Firstly, these filters have a finite lifespan; their cartridges need regular replacement depending on the volume and quality of the water filtered, which can become a recurring expense and maintenance hassle for users. Moreover, not all contaminants are effectively removed by standard cartridges. Additionally, the flow rate of water can be significantly reduced when passing through a filter, which might be inconvenient for users who require a faster water output for activities like filling pots or washing. The installation of these filters may also pose challenges, especially in kitchens with non-standard faucets or limited space around the sink area, making them incompatible or difficult to fit without additional adapters or modifications.

Another notable limitation of typical kitchen faucet water filters is their restriction to a single, downward-directed water stream. This design constraint stems from the water filter's fixed position at the faucet's outlet, where it channels filtered water straight down into the sink. While this directional flow is practical for tasks such as filling cups or washing dishes, it significantly limits usability for other activities, such as washing one's face directly from the faucet.

In scenarios where users might prefer a more flexible water stream, for instance, to direct the flow sideways or upwards, the rigid, downward orientation can be cumbersome and impractical. This limitation requires users to adapt by using additional receptacles like cups or bowls to catch and redirect water, which can be inconvenient and less efficient. The lack of maneuverability in the water stream thus restricts the filter's utility beyond basic kitchen functions, affecting its versatility and user satisfaction in broader daily hygiene and cleaning tasks.

The need exists therefore for an improved water filter allowing a more flexible and universal use of a faucet for a variety of daily routines.

SUMMARY

Accordingly, it is an object of the present invention to overcome these and other drawbacks of the prior art by providing a novel faucet-mounted water filter that allows the user to easily adjust the direction of the water stream emanating from the water outlet of the device.

It is another object of the present invention to provide a novel faucet-mounted water filter with a replaceable water filter cartridge.

It is a further object of the present invention to provide a novel faucet-mounted water filter with a dual-stream option meaning that the user may select to direct the water flow through an unfiltered water outlet or a filtered water outlet.

It is yet a further object of the present invention to provide a novel faucet-mounted water filter that can be used with any common water faucet such as kitchen water faucets.

The faucet-mounted water filter of the present invention features a filtered water stream with an adjustable direction. The water filter may include a main body and a cylindrical outlet body shaped as and positioned as an extension of the cylindrical portion of the main body. The main body, in turn, may include a horizontally elongated cylindrical portion and an extension portion extending from a side of the cylindrical portion.

The cylindrical portion may include an internal cylindrical cavity extending therein and sized to removably accept an elongated replaceable cylindrical water filter cartridge therein. The cylindrical portion may define a first end and a second end longitudinally opposed to the first end. An endcap may be provided and adapted to removably attach to the first end of the cylindrical portion. The end cap may be configured to secure and seal off the water filter cartridge inside the cylindrical portion of the main body.

The extension portion of the main body may, in turn, include a faucet attachment adapter configured to removably attach the faucet-mounted water filter to a faucet. The extension portion may also include an unfiltered water outlet located, for example, opposite the faucet attachment adapter. Finally, the extension portion may include a flow diverter assembly having a knob accessible from outside the extension portion. The knob or another mechanical switch may be operable to select one of the following operation modes:

(i) directing water from the faucet attachment adapter to the unfiltered water outlet to bypass the water filter cartridge, or (ii) directing water from the faucet attachment adapter toward the cylindrical portion to facilitate water filtration using the water filter cartridge.

Furthermore, the second end of the cylindrical body may define a planar edge positioned at an inclination angle to a longitudinal axis of the cylindrical portion. The second end may also feature a body water passage with a center line extending from the internal cylindrical cavity orthogonally to the planar edge of the second end.

The cylindrical outlet body may have an outlet wall positioned at the same inclination angle as the planar edge. It may also be adjacent to the planar edge of the second end of the cylindrical portion.

The outlet body may include a filtered water outlet extending from a cylindrical side wall thereof. To support the main feature of the invention, the outlet body is rotatably and sealingly mounted on the body water passage of the cylindrical portion via a curved outlet water passage operably extending through the outlet body and toward the filtered water outlet. This facilitates filtered water to exit through the outlet body at the side wall thereof. Therefore, rotation of the outlet body about an axis of rotation coinciding with the central line of the body water passage causes a change in a filtered water stream direction.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF PREFERRED EMBODIMENTS OF THE INVENTION

Figure 1:
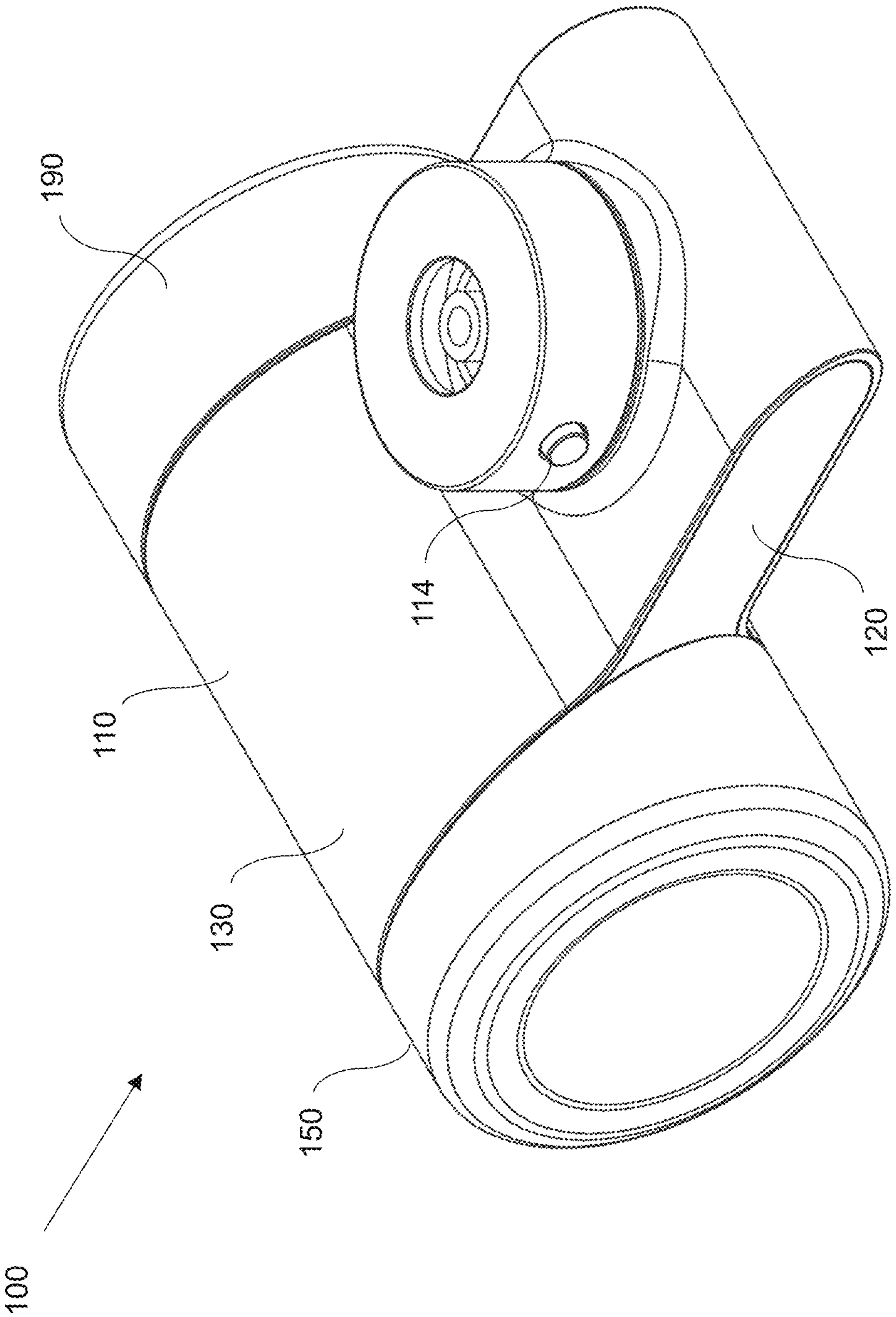
FIG. 1 is a first perspective view of a novel faucet-mounted water filter.
Figure 2:
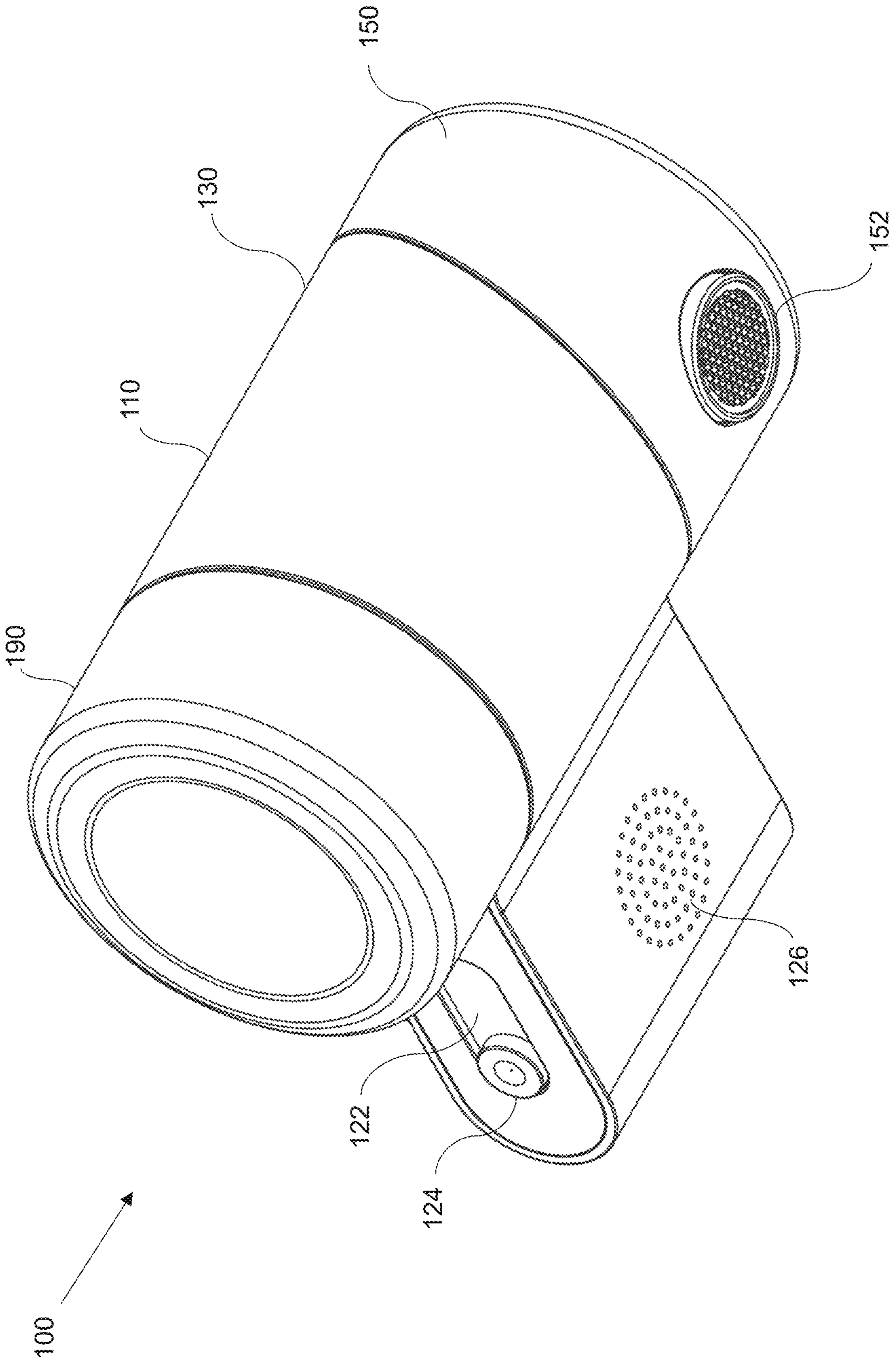
FIG. 2 is a second perspective view thereof.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The faucet-mounted water filter 100 of the present invention is generally seen in different views in FIG. 1-13. In broad terms, the water filter 100 may include a main body 110 and a cylindrical outer body 150. The main body 110, in turn, may include a horizontally elongated cylindrical portion 130 and an extension portion 120 extending from a side of the cylindrical portion 130.

The cylindrical portion 130 may include an internal cylindrical cavity 132 (see FIG. 10 and FIG. 11) extending therein and sized to removably accept an elongated replaceable cylindrical water filter cartridge 194 therein. A variety of water filter cartridges may be used with the water filter of the present invention. Broadly speaking, water filter cartridges designed for attachment to kitchen faucets help to improve the quality of household water supply by removing contaminants and enhancing taste. These cartridges employ various filtration technologies, each suited to specific filtration needs. The following is a short discussion of various types of water filter cartridges that may be used with the present invention:

- Sediment Cartridges: Primarily used to capture large particles such as sand, dirt, and rust, sediment cartridges typically feature a multi-layered construction. The outer layers are more porous to trap larger particles, while the inner layers have finer mesh to remove smaller debris. Materials often used in these cartridges include spun or pleated polypropylene, polyester, or cellulose fibers, which offer a high dirt-holding capacity and a long service life,
- Carbon Block Cartridges: These cartridges are composed of compressed activated carbon that provides extensive contaminant removal through adsorption. Activated carbon is effective in reducing chlorine, volatile organic compounds (VOCs), pesticides, and certain heavy metals, while also improving the taste and odor of the water. The density of the carbon block affects both the flow rate and contaminant removal efficiency,
- Granular Activated Carbon (GAC) Cartridges: Similar to carbon block, GAC cartridges contain loose granules of activated carbon. While they allow for higher water flow rates, they typically have a lesser contact time with water, which can slightly reduce contaminant removal efficiency compared to carbon block cartridges. GAC filters are particularly effective in removing chlorine and improving taste and odor,
- Ceramic Cartridges: Utilizing the fine porosity of ceramic material, these cartridges can remove very fine particulates and pathogens such as bacteria and cysts from the water supply. The surface of ceramic cartridges can be cleaned and reused multiple times, offering a sustainable option for filtration needs, and
- Specialty Cartridges: These are designed to target specific contaminants that are not commonly addressed by standard filters. For example, cartridges incorporating ion exchange resins are used to soften hard water by removing calcium and magnesium ions, or to reduce specific contaminants like lead and arsenic. Another variant includes multi-stage filters that combine several filtration methods, such as sediment filtration followed by carbon adsorption and a final micron filter to catch ultrafine particles.

Each type of water filter cartridge may be tailored to the specific needs and water quality issues faced by a household, ensuring that water filtration systems can be customized effectively. Regular replacement of these cartridges is critical to maintain optimal water quality and filtration performance.

The cylindrical portion 130 may define a first end 134 and a second end 136 longitudinally opposed to the first end. An internal wall 138 may be positioned across the internal cylindrical cavity 132 and be configured to removably and sealingly accept an outlet end of the water filter cartridge 198 therein, for example by inserting with an O-ring 199. The location of the water filter cartridge 194 may be designed to allow an unfiltered water stream to enter the cartridge at the inlet side 196 thereof (which may be perforated to allow water to enter the internal space of the cartridge), proceed through the cartridge to be filtered inside thereof, and emerge at the outlet end 198 to proceed further to the filtered water outlet as described below in greater detail.

An endcap 190 may be provided and adapted to removably attach to the first end 132 of the cylindrical portion 130, for example using a threaded connection between the endcap 190 and the main body 110. The end cap 190 may be configured to secure and seal off the water filter cartridge 194 inside the cylindrical portion 130 of the main body 110, for example using an O-ring 192.

The extension portion 120 of the main body 110 may, in turn, include a faucet attachment adapter 112 configured to removably attach the faucet-mounted water filter 100 to a faucet 10. While only one type of faucet attachment adapter 112 is seen in the drawings, it should be understood that a variety of such adapters may be used for the faucet-mounted filter, as the invention is not limited in this regard. Broadly speaking, attachment fittings and adapters may be designed to ensure a secure and efficient connection between the water filter and the kitchen faucet or another house faucet. These attachment adapters must be designed to accommodate various faucet designs and sizes while providing a leak-proof seal and easy installation and maintenance. Some common types of attachment fittings useful for the purposes of the present invention may include:

- Threaded Adapters: These are among the most common fittings used for attaching water filters to kitchen faucets. Threaded adapters are designed to match the external or internal threads of a faucet spout, allowing for a straightforward screw-on installation. These adapters come in various sizes and thread patterns to accommodate different faucet makes and models. Materials such as brass, stainless steel, or durable plastics are typically used for manufacturing these adapters to ensure longevity and resistance to wear and water pressure,
- Push-Fit Connectors: Also known as quick-connect fittings, these connectors allow for tool-free installation, making them user-friendly and time-efficient. Push-fit connectors work by simply inserting the tubing from the filter system into the fitting, which is equipped with stainless steel teeth or a collet that grips the tube securely in place while an O-ring provides a watertight seal. These fittings are made from materials like high-grade plastic or metal and are popular for their reliability and ease of disconnecting and reconnecting for filter maintenance or replacement, Clip-On Adapters: Designed for ease of use, clip-on adapters quickly attach to the faucet without the need for threading. These adapters typically use a spring-loaded clip or a similar mechanism that locks onto the faucet nozzle. They are particularly useful for faucets that do not have standard threaded ends or have non-removable aerators. Clip-on adapters are usually constructed from plastics or composites that provide flexibility and durability, Universal Faucet Adapters: These fittings are designed to accommodate a wide range of faucet sizes and styles. Universal adapters often include several different sizes of rubber or silicone washers and multiple threaded patterns to ensure compatibility with most faucets. They might also feature adjustable components that can be expanded or contracted to fit snugly onto the faucet spout. The adaptability of universal adapters makes them a versatile solution for households with uncommon faucet designs, Aerator Adapters: Some water filters use aerator adapters, which replace the faucet's existing aerator. These adapters have dual functionality: they serve as a point of attachment for the filter and maintain the faucet's ability to aerate the water, which helps conserve water and maintain water pressure. Made typically from chrome-plated brass or stainless steel, these adapters ensure durability and an aesthetically pleasing look.

Figure 29:
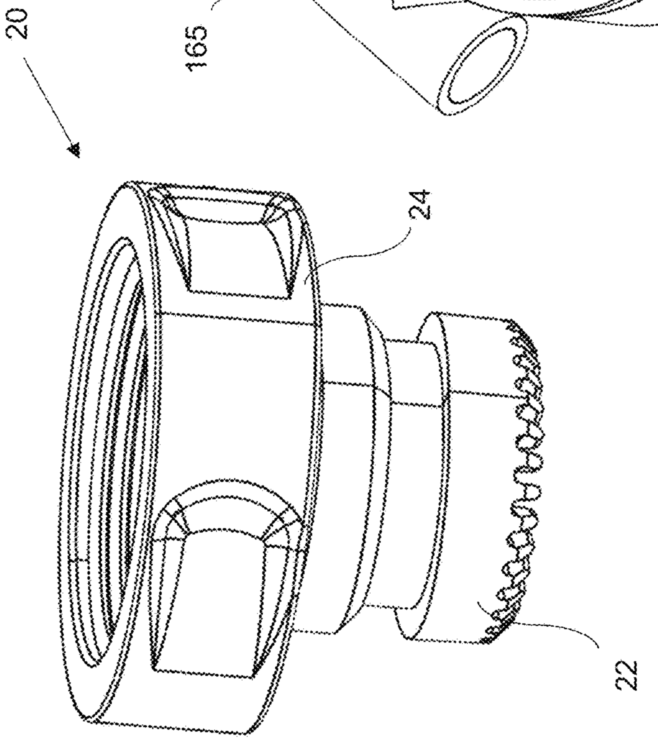
FIG. 29 is a perspective view of a transition piece for the attachment of the water filter to a kitchen faucet.

The exemplary faucet attachment adapter 112 shown in the drawings includes a version of a clip-on adapter. When two opposing spring-loaded buttons 114 are pressed toward each other, a first end 22 of a transition piece 20 (see FIG. 29) may be inserted into and be sealingly retained in the faucet attachment adapter 112 when the buttons 114 are released. The second end 24 of the transition piece 20 may have a thread configured to be attached to the spout of the kitchen faucet.

The extension portion 120 of the main body 110 may also include an unfiltered water outlet 126. In some embodiments, unfiltered water outlet 126 may be located on a lower part of the extension portion 120, such as opposite the faucet attachment adapter 112.

Once the water passes through the transition piece, it enters the main cavity of the extension portion 120 of the water filter 100. The extension portion 120 may contain a flow diverter assembly 122 having a knob 124 accessible to the user from outside the extension portion 120. The knob 124 or another mechanical lever switch may be operable while in a first position to direct water flow from the faucet spout through the faucet attachment adapter 112 down through the unfiltered water outlet 126, seen in greater detail in FIG. 30. This operation of the water filter may be useful when using the water for purposes where no filtration may be needed, for example for washing dishes.

Figure 32:
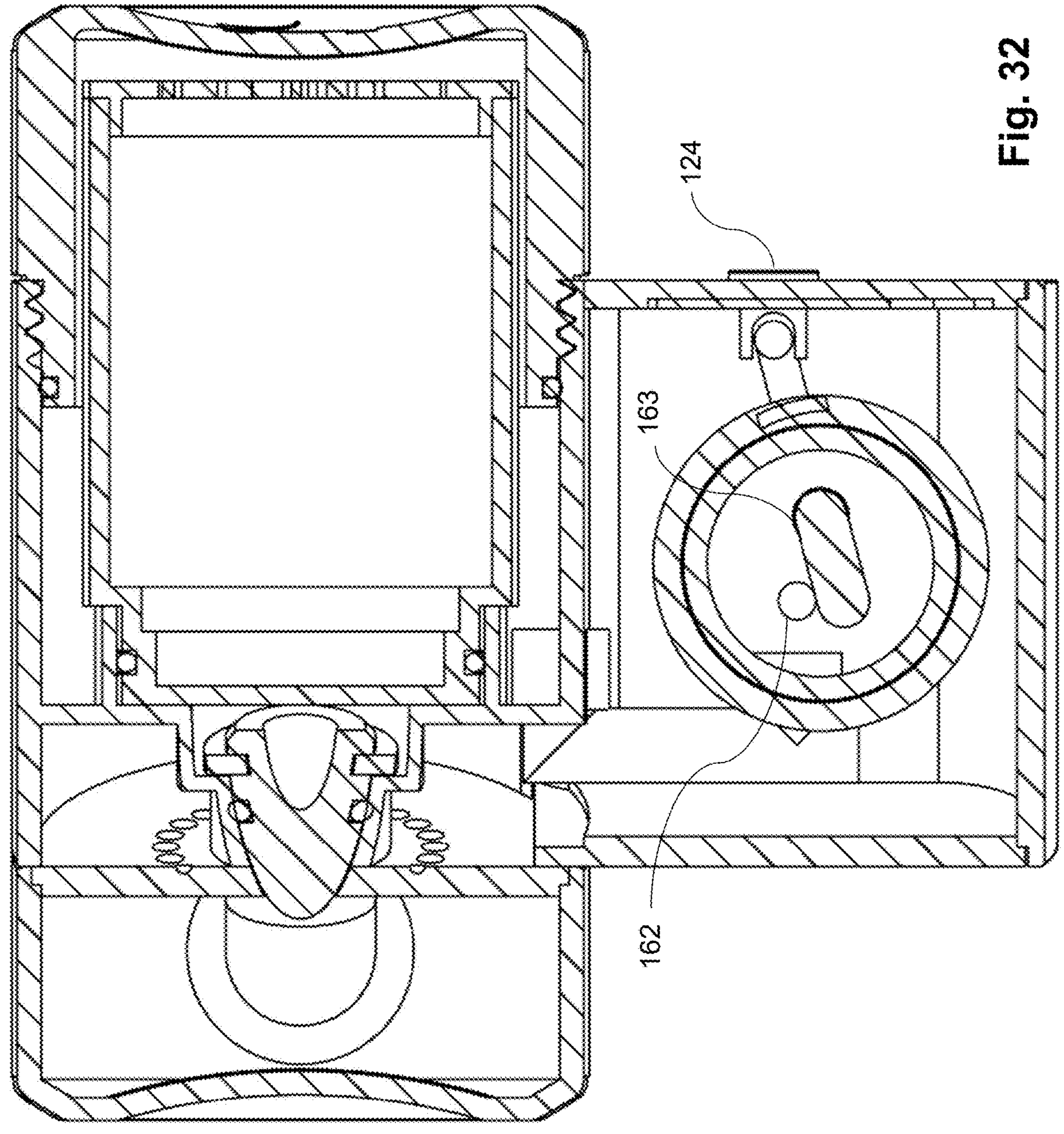
FIG. 32 is the same but showing the position of the flow diverter to direct the flow of water to the filtered water outlet.

At the same time, shifting of the knob 124 to a second position opposite the first position, in which the diverter selector 163 may be turned so as to direct the water flow away from the unfiltered water outlet 126, through the internal cavity of the extension portion 120, and toward the cylindrical portion 130 of the main housing 110, as seen in greater detail in FIG. 32. In this second position of the knob 124, the water would flow through the water filter cartridge 194 and toward the filtered water outlet 152.

Figure 30:
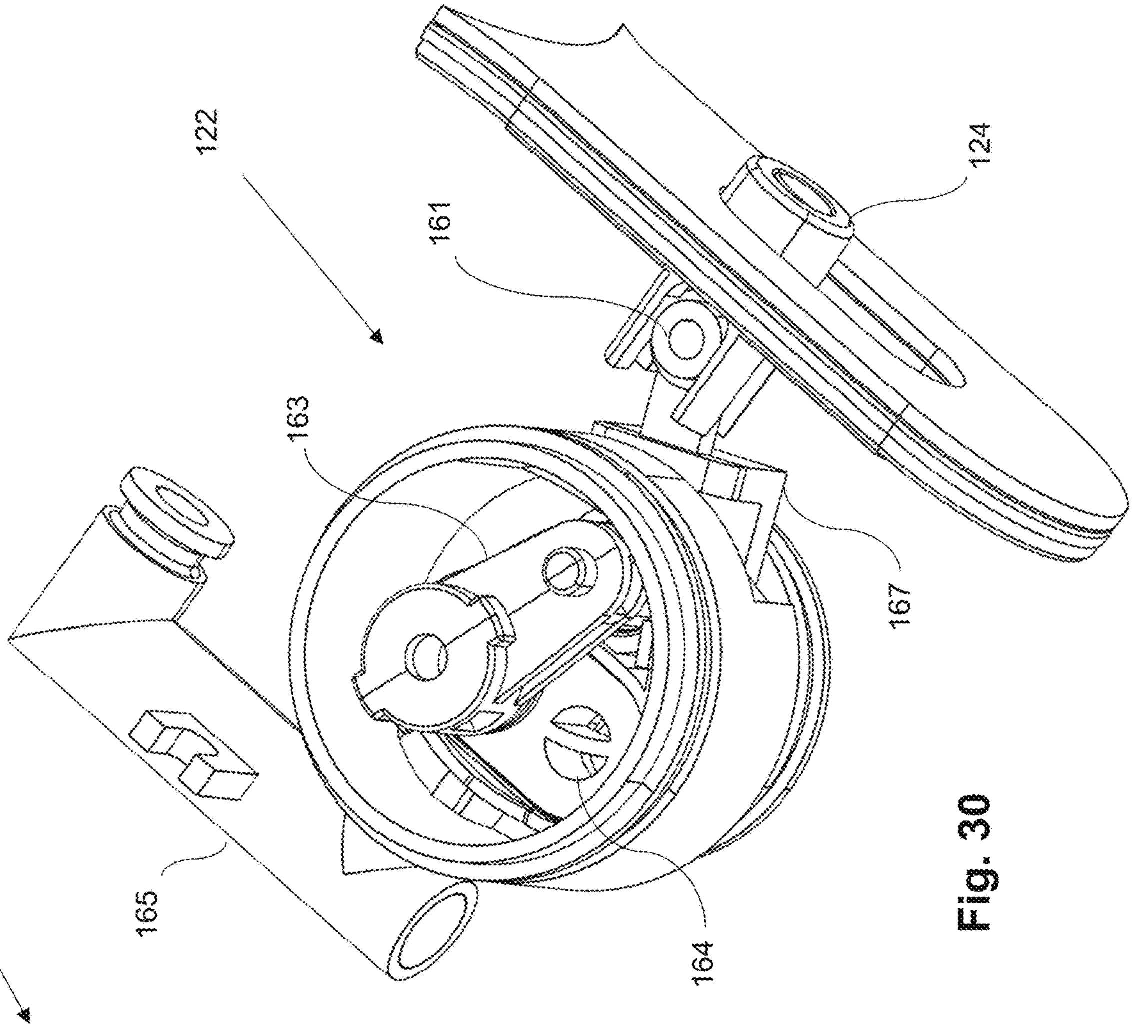
FIG. 30 is a perspective partial view (some elements are removed for clarity) of a mechanism of the flow diverter designed to select either the unfiltered water outlet or a filtered water outlet for the water to emanate from the water filter of the present invention, the position shown in the drawing is that of directing water to the filtered water outlet.
Figure 31:
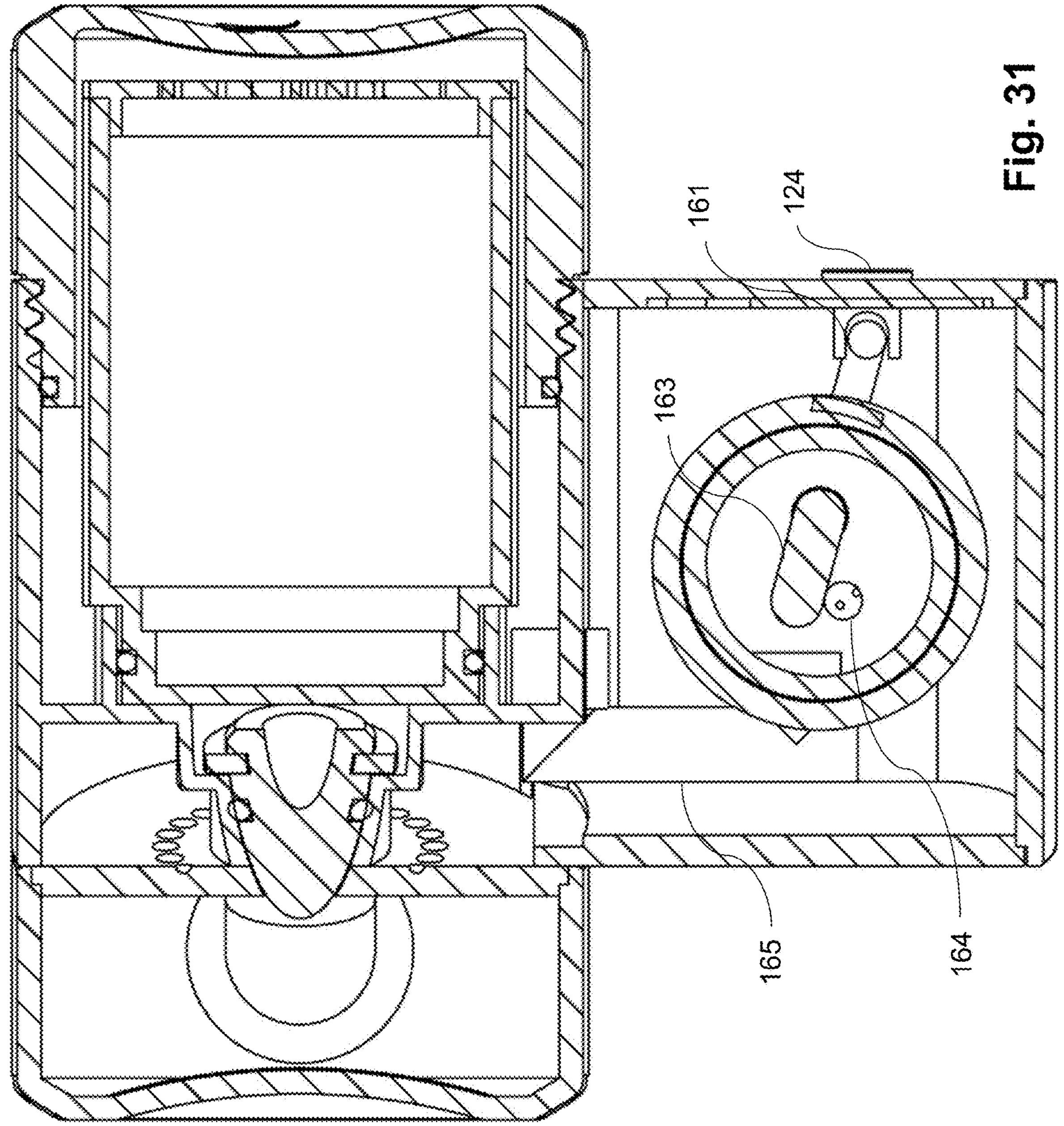
FIG. 31 is a cross-sectional view showing the details of the flow diverter for directing the water flow toward the unfiltered water outlet.

In one exemplary design shown in FIGS. 30, 31, and 32, the flow diverter assembly 122 may include a knob 124 operable via pivot joint 161 to move the selector 163 to close off one of the two water openings, an unfiltered water opening 164 and a filtered water opening 162. When the filtered water opening 162 is closed off by the selector 163, water flow proceeds through the unfiltered water opening 164 and through the unfiltered water opening 126—see FIG. 31.

When the knob 124 is shifted to the opposite position, the selector 163 is rotated to close off the filtered water opening 162 and open the filtered water opening 162 for the water to flow therethrough. The water then proceeds from the cavity of the extension portion 120 through a U-shaped tube 165 and toward the inlet side 196 of the water filter cartridge 194, and then toward the filtered water outlet 152.

Therefore, the knob 124 and the entire water diverter assembly 122 may be placed in one of the two positions which would define the function of the water filter 100 in one of the following operation modes:

(i) directing water from the faucet attachment adapter 112 to the unfiltered water outlet 126 to bypass the water filter cartridge 194, or (ii) directing water from the faucet attachment adapter 112 toward the cylindrical portion 130 to facilitate water filtration using the water filter cartridge 194.

Figure 3:
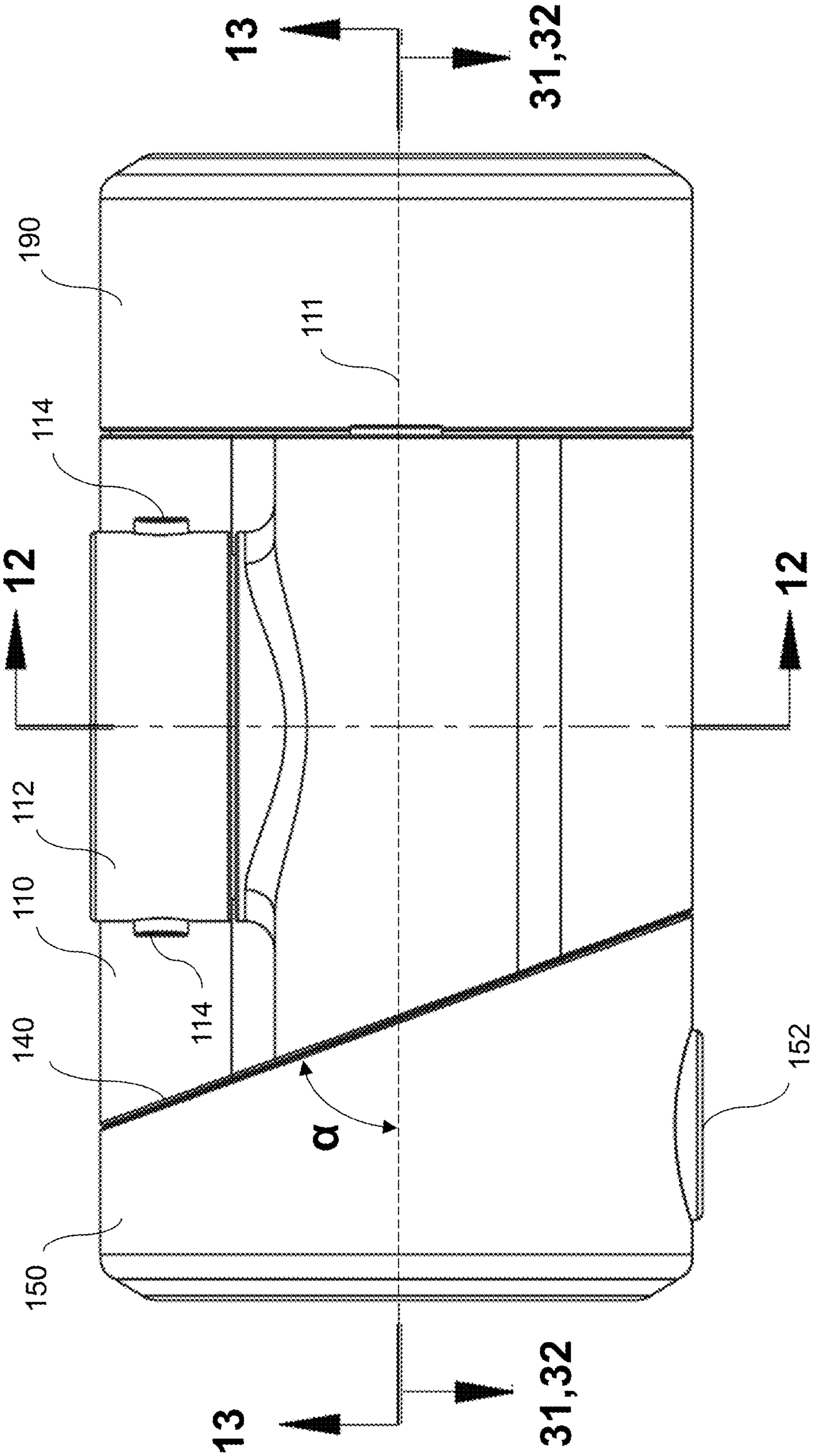
FIG. 3 is a front view of the same.
Figure 4:
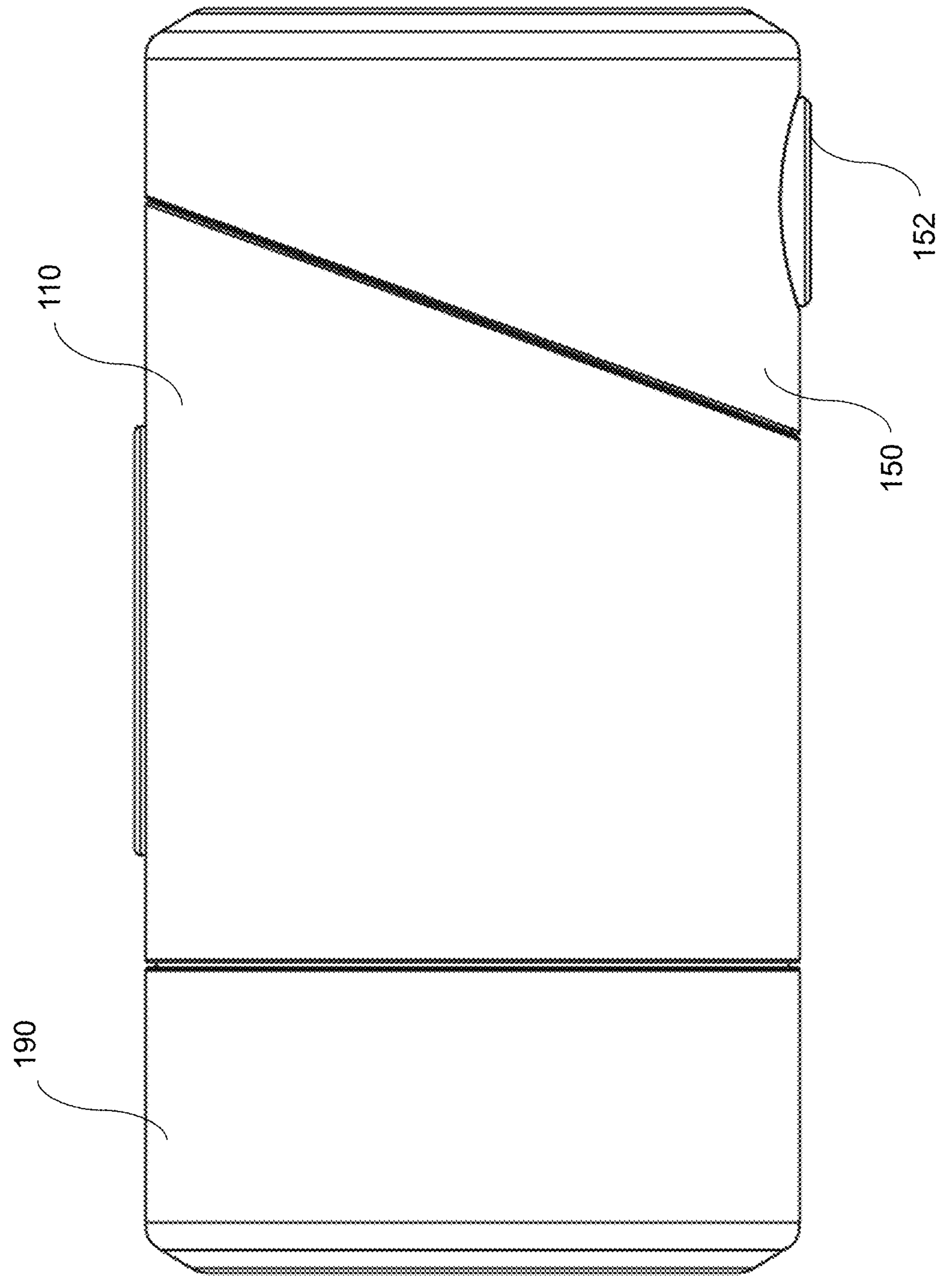
FIG. 4 is a rear view of the same.
Figure 5:
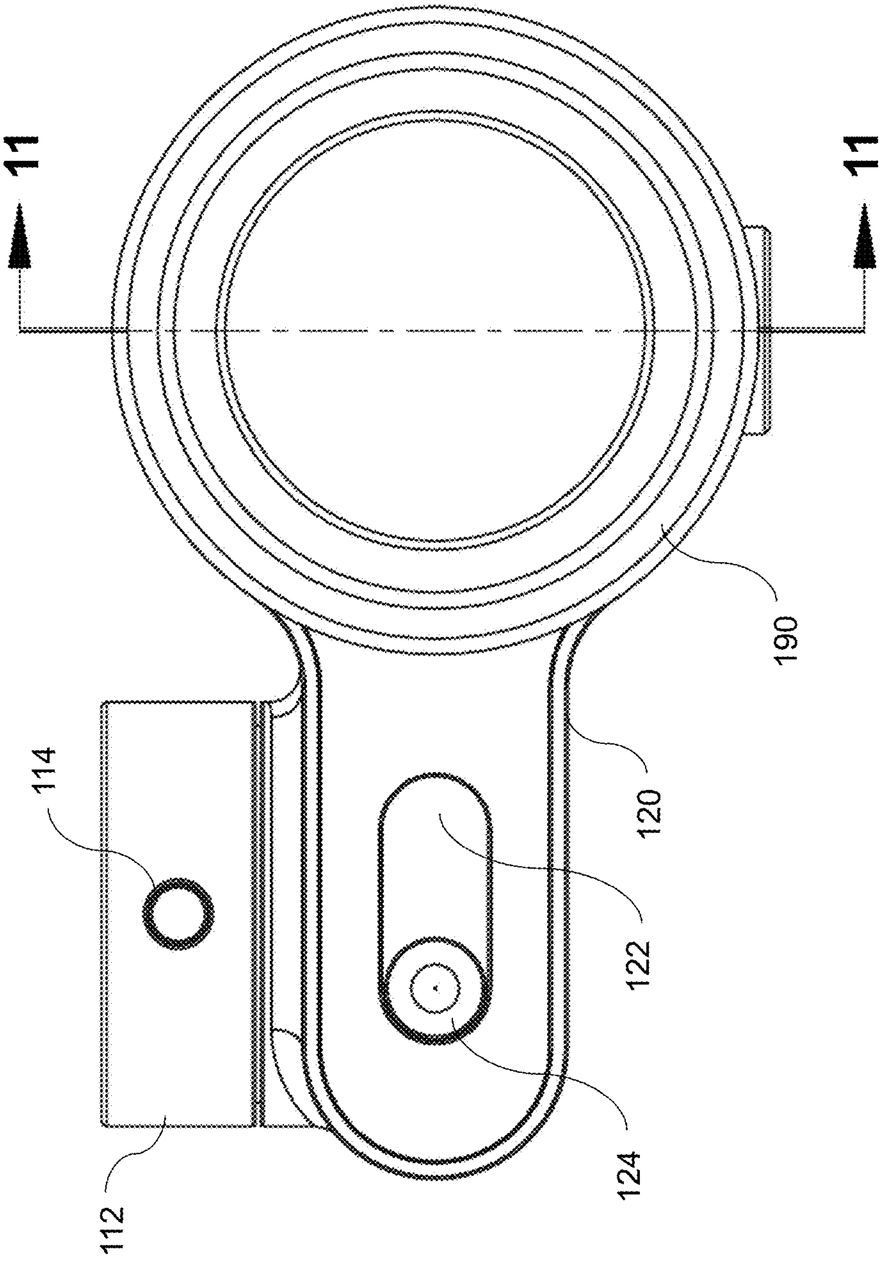
FIG. 5 is a first side view of the novel faucet-mounted water filter.
Figure 6:
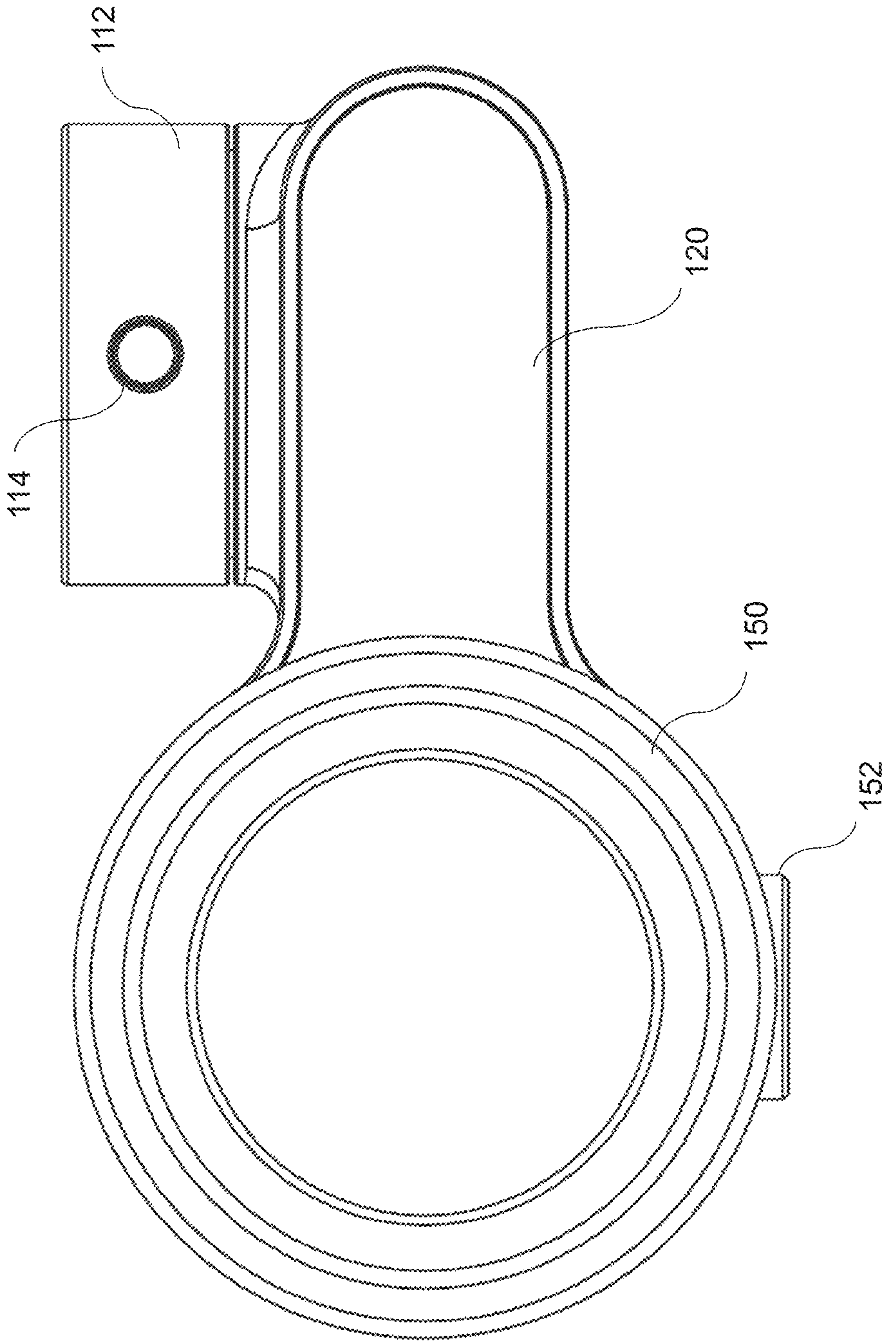
FIG. 6 is a second side view of the same from an opposite side to that shown in FIG. 5.
Figure 7:
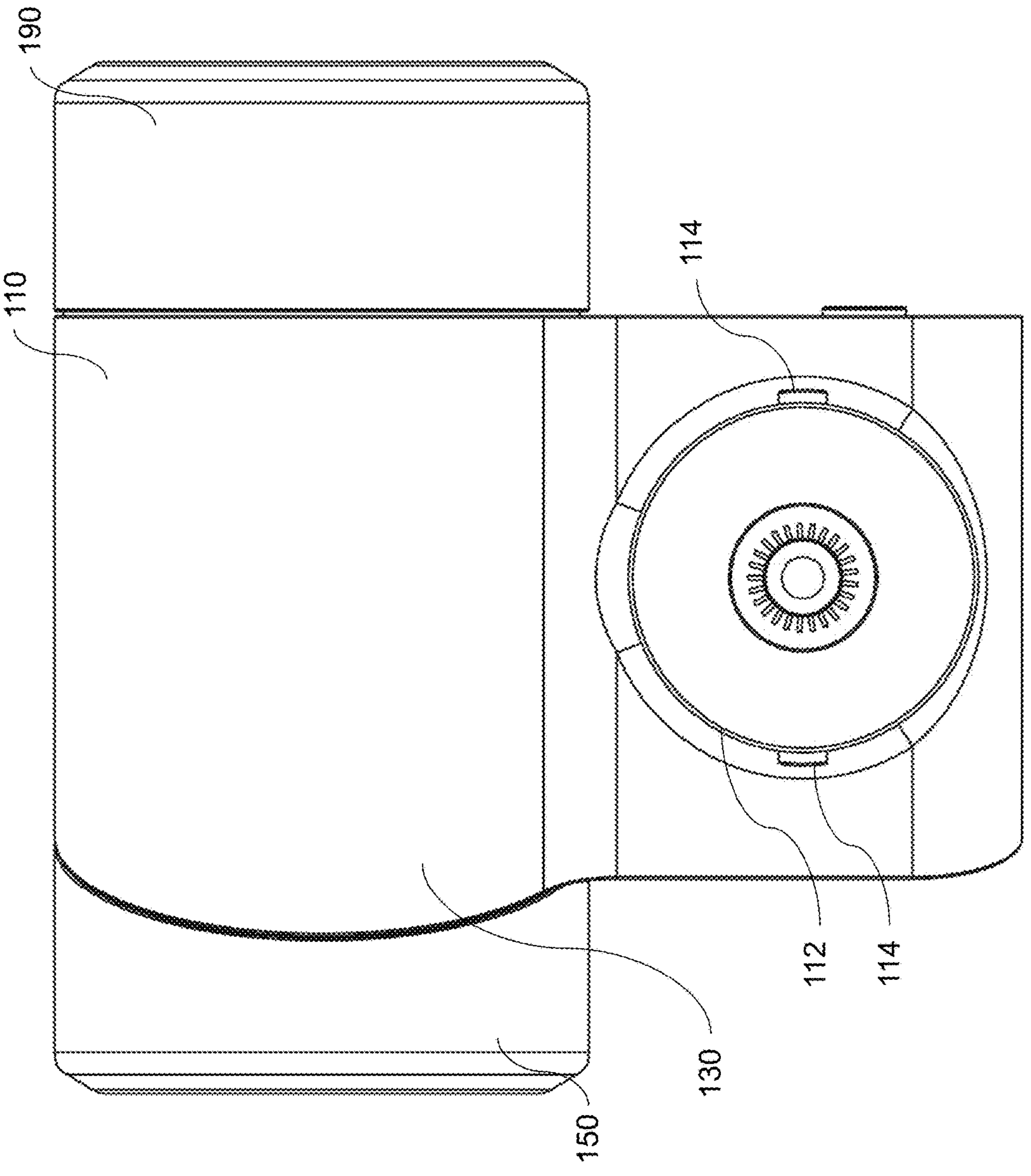
FIG. 7 is a top view of the water filter.
Figure 8:
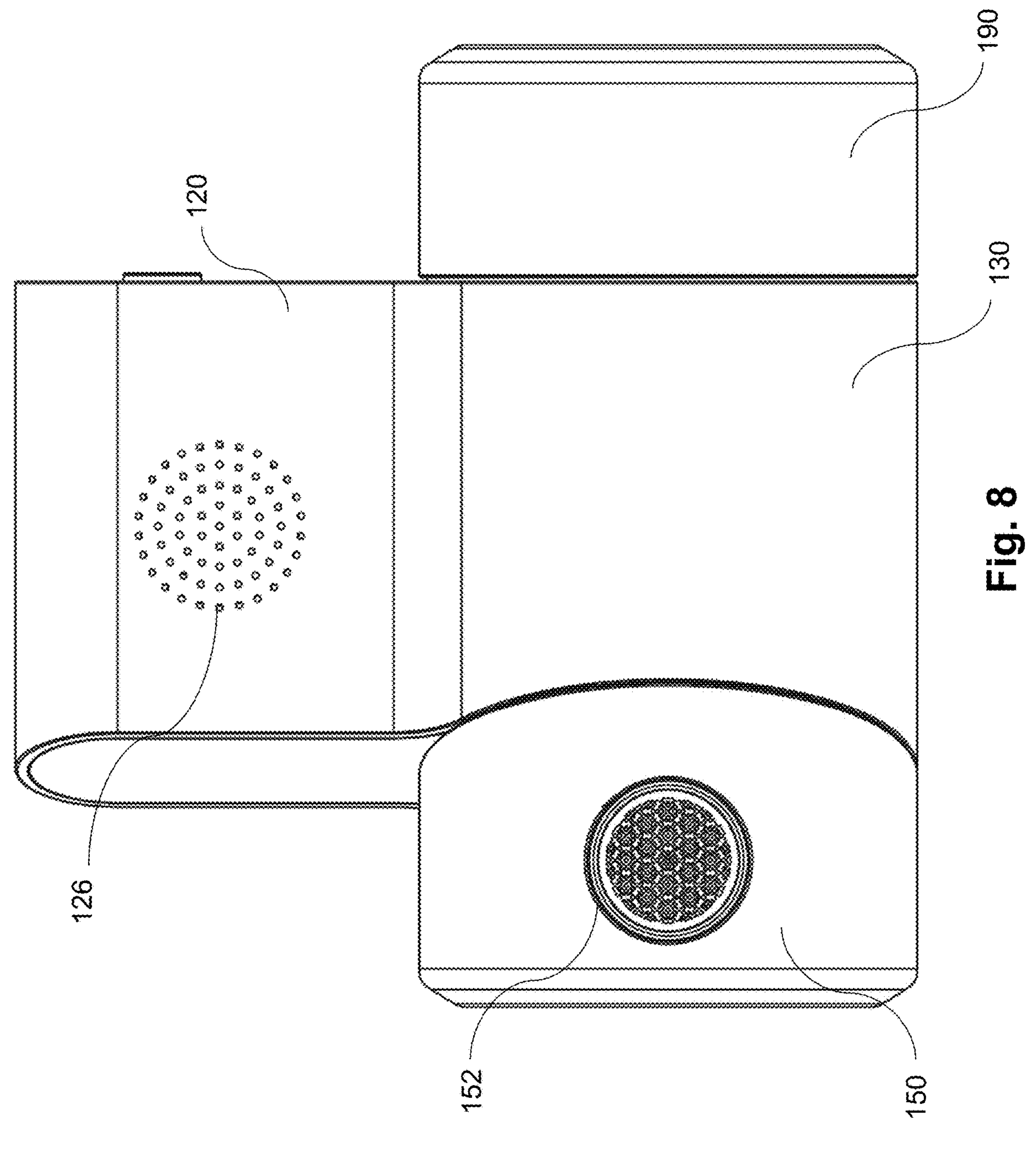
FIG. 8 is a bottom view thereof.
Figure 9:
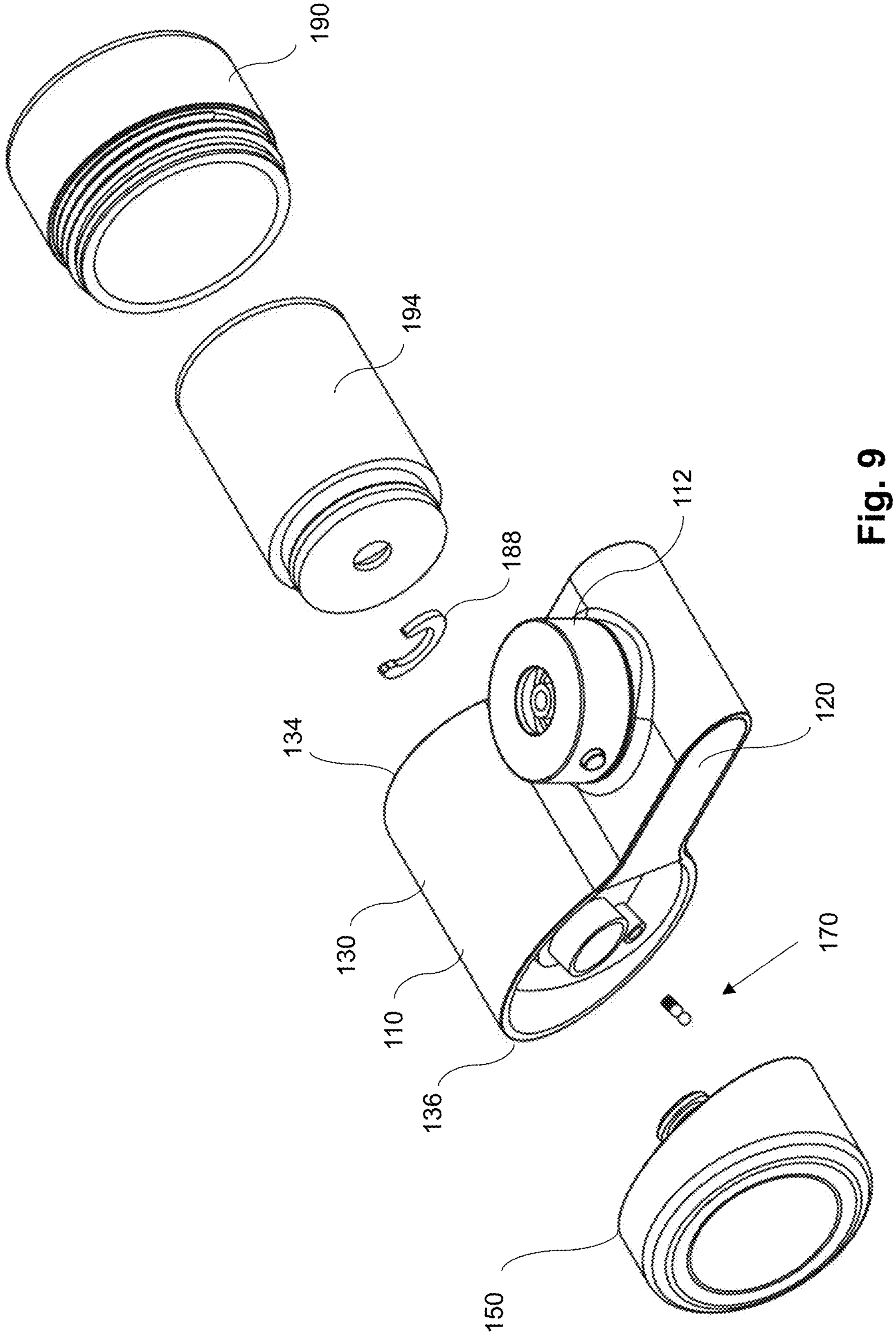
FIG. 9 is a first exploded view of the water filter.
Figure 10:
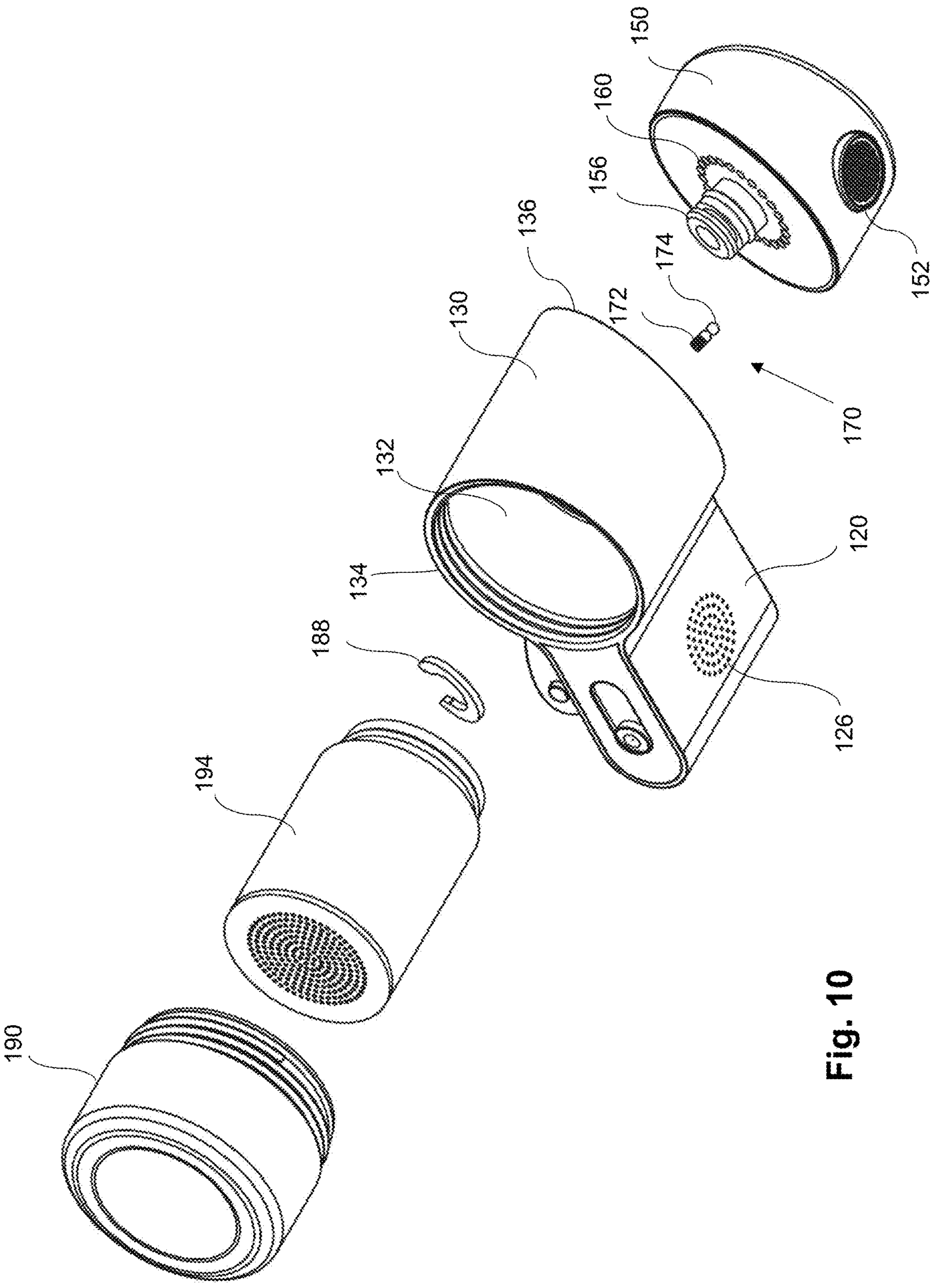
FIG. 10 is a second exploded view of the same.

Returning to the description of the main body 110, the second end 136 of the cylindrical body 130 may define a planar edge 140 positioned at an inclination angle α to a longitudinal axis 111 of the cylindrical portion 130 (see FIG. 3). In embodiments, the inclination angle α may vary from about 45 degrees to less than 90 degrees, such as at least 45 degrees, at least 50 degrees, at least 55 degrees, at least 60 degrees, at least 65 degrees, at least 70 degrees, at least 75 degrees, at least 80 degrees, or up to but not exceeding 90 degrees. As can be appreciated by those skilled in the art, at the inclination angle α of 45 degrees, rotation of the outlet body would cause a change of the water stream direction through the filtered water outlet 152 from a vertically down to a horizontal direction. As the inclination angle α increases in value, the water stream may be turned to be higher than the horizontal direction, as explained below in greater detail.

As discussed above, the outlet body 150, shaped as and positioned as an extension of the cylindrical portion 130 of the main body 110, may include the filtered water outlet 150 extending from a cylindrical side wall thereof. To support the main feature of the invention, namely the ability of the user to change the direction of the filtered water stream, the outlet body 150 is rotatably and sealingly mounted on the water passage 142 of the cylindrical portion 130 with the outlet water passage 154 operably extending through the outlet body 150 and toward the filtered water outlet 152. This facilitates filtered water to exit through the outlet body 150 at the side wall thereof. Therefore, rotation of the outlet body 150 about an axis of rotation coinciding with the central line of the water passage 142 causes a change in a filtered water stream direction.

Figure 11:
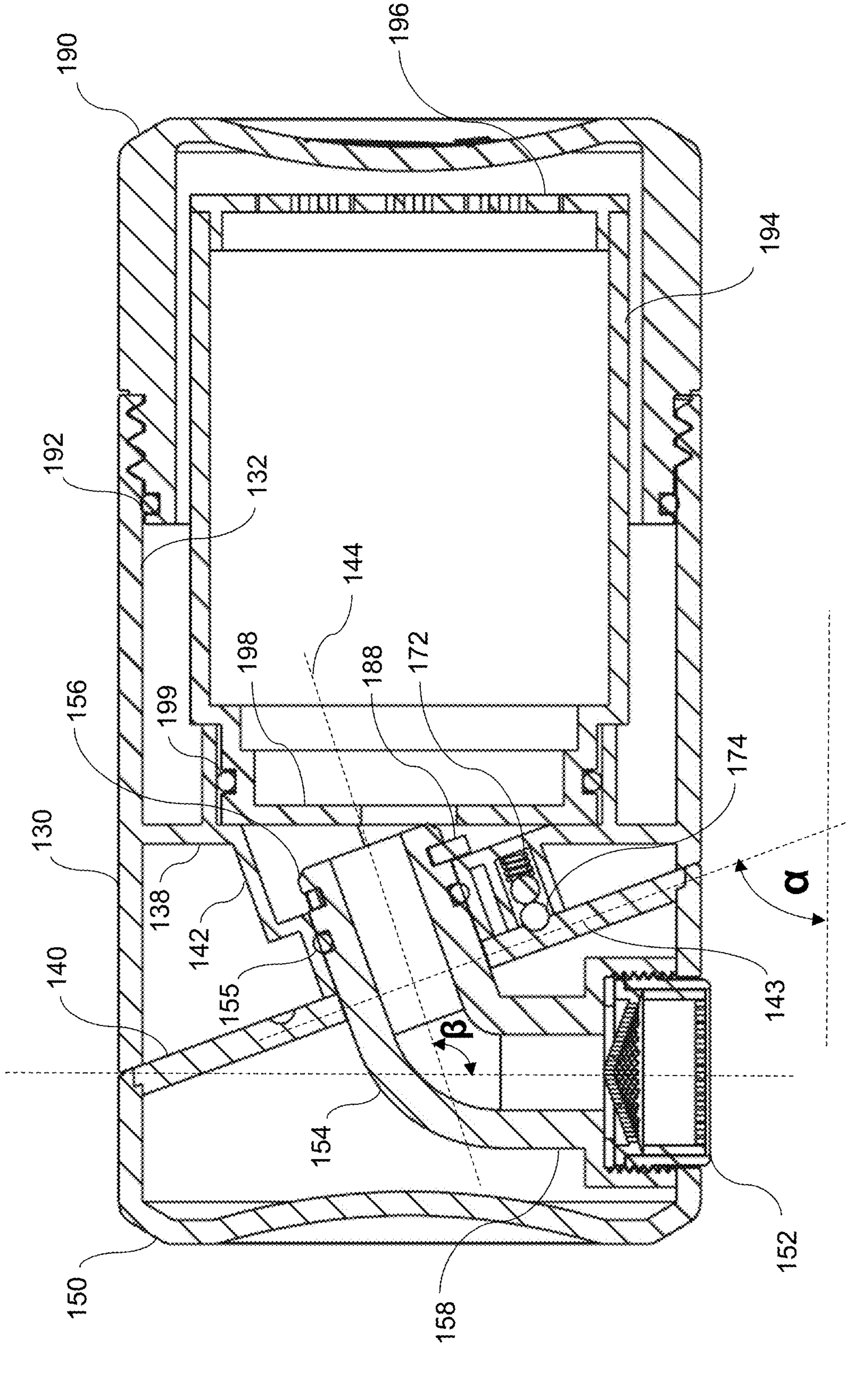
FIG. 11 is a first cross-sectional view of the water filter, as indicated in FIG. 5.
Figure 12:
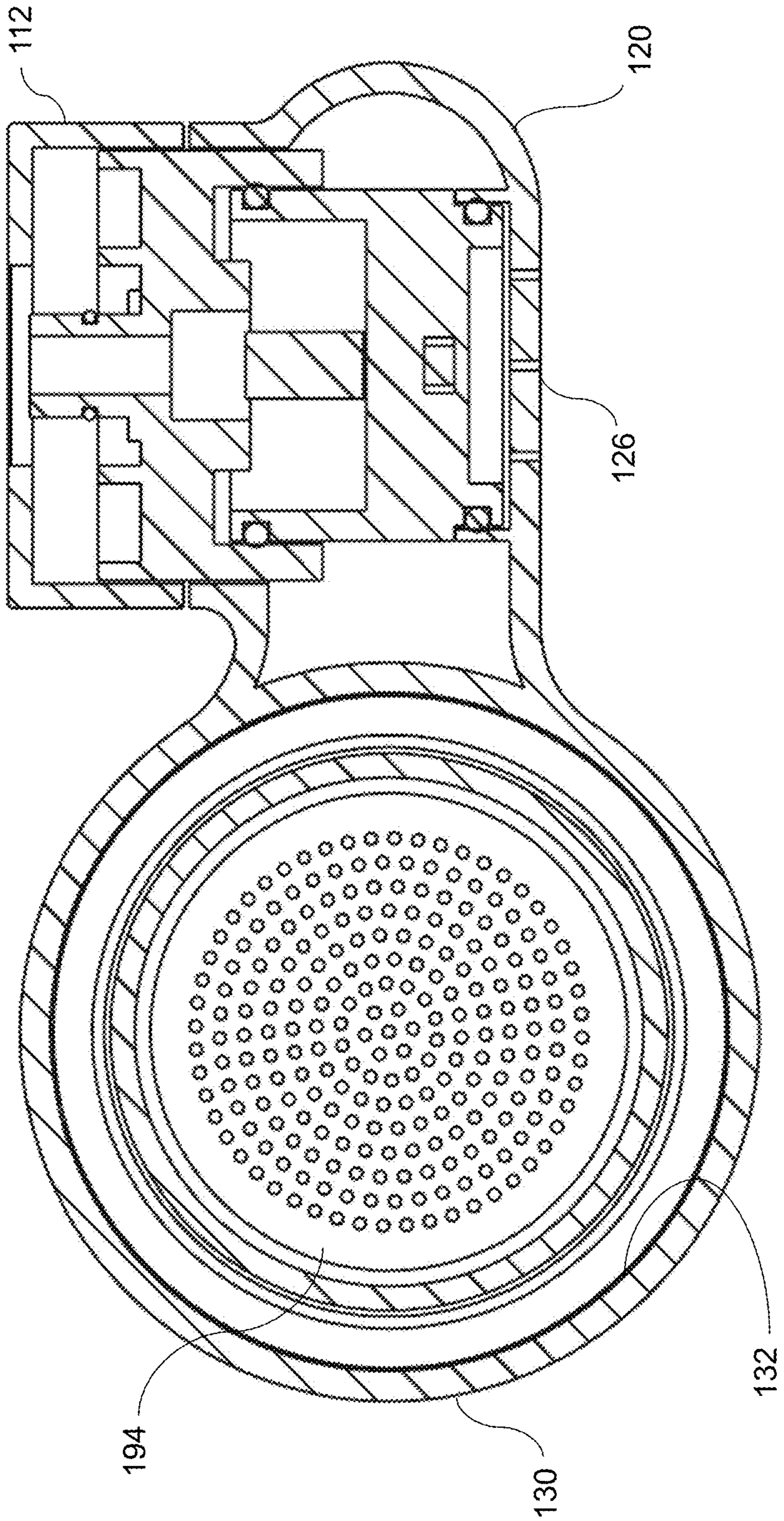
FIG. 12 is a second cross-sectional view of the same, as indicated in FIG. 3.
Figure 13:
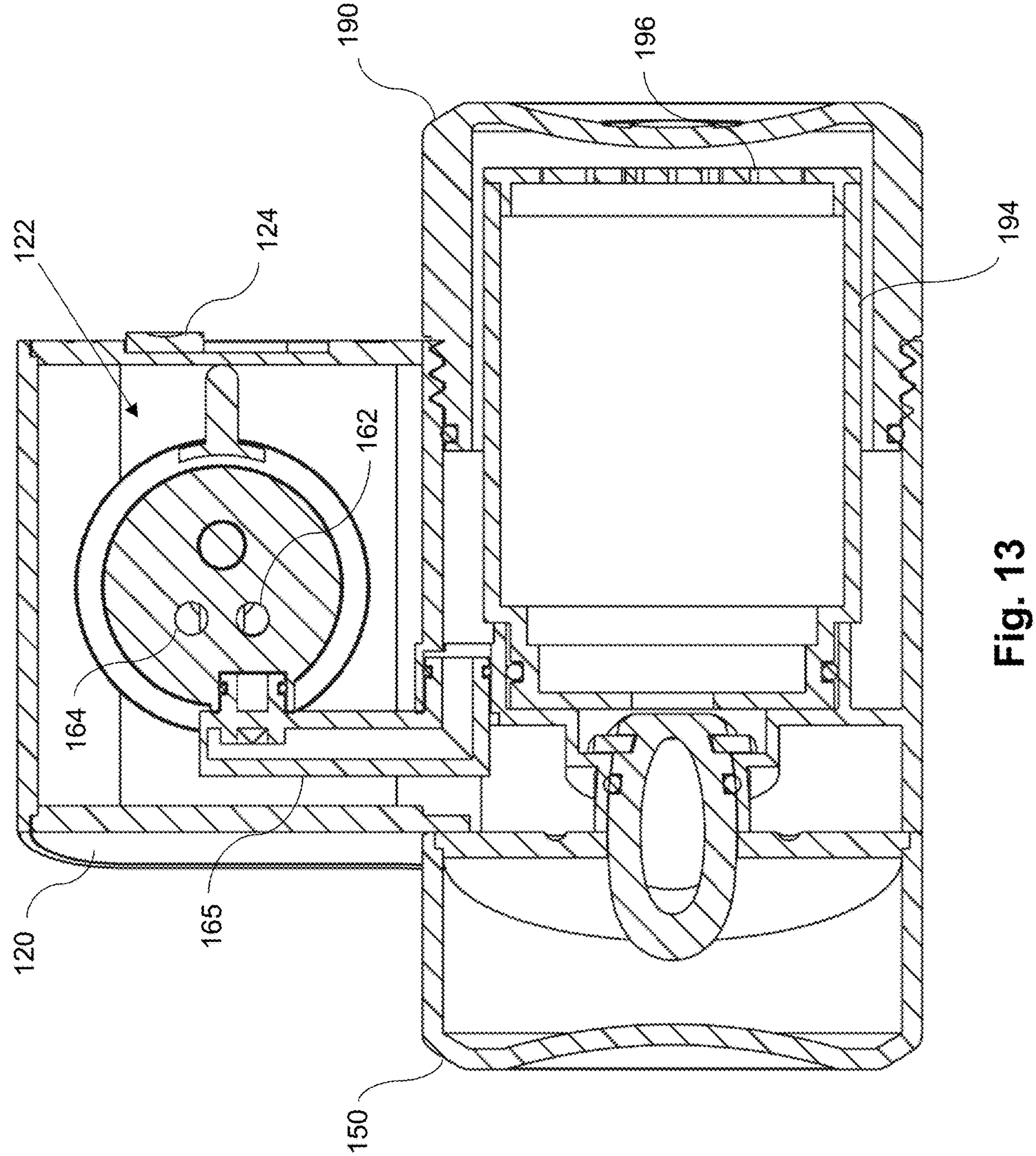
FIG. 13 is a third cross-sectional view of the same, as indicated in FIG. 3.

More specifically, the second end 136 may also feature a body water passage 142 with a center line 144 extending from the internal cylindrical cavity 132 orthogonally to plane 143 the planar edge 140 of the second end 136—see FIG. 11. The body water passage 142 may be configured to rotatably and sealingly retain the first part 156 of the curved outlet water passage 154 extending through the outer body 150. In one exemplary design shown in the drawings, the first part 156 is sealed against the body water passage 142 using the O-ring seal 155. It is rotatably retained by the C-ring 133, also shown in FIGS. 9 and 10. The second part 158 of the curved outlet water passage 154 may extend through the outer body 150 and terminate in the filter water outlet 152, as seen in greater detail in FIG. 11. The first part 156 may be tilted with regard to the second part 158 of the curved water passage 154 at the tilt angle β, which may vary from greater than 90 degrees to less than 135 degrees. In embodiments, the tilt angle β may be selected to be at least 95 degrees, at least 100 degrees, at least 110 degrees, at least 120 degrees, at least 130 degrees, or up to but not including 135 degrees.

Furthermore, in some embodiments, there may be a certain relationship between angles α and β. These two angles may be selected to ensure that the filtered water outlet 152 faces downward when the outer body 150 is turned to position the filtered water outlet 152 in its lowest position. In one example, angles α and β may be selected to be 70 degrees and 110 degrees. In other cases, the sum of angles α and β may be selected to be 180 degrees so as to ensure the filtered water outlet 152 faces vertically down in the position of the outer body 150 seen in FIG. 11.

Figure 19:
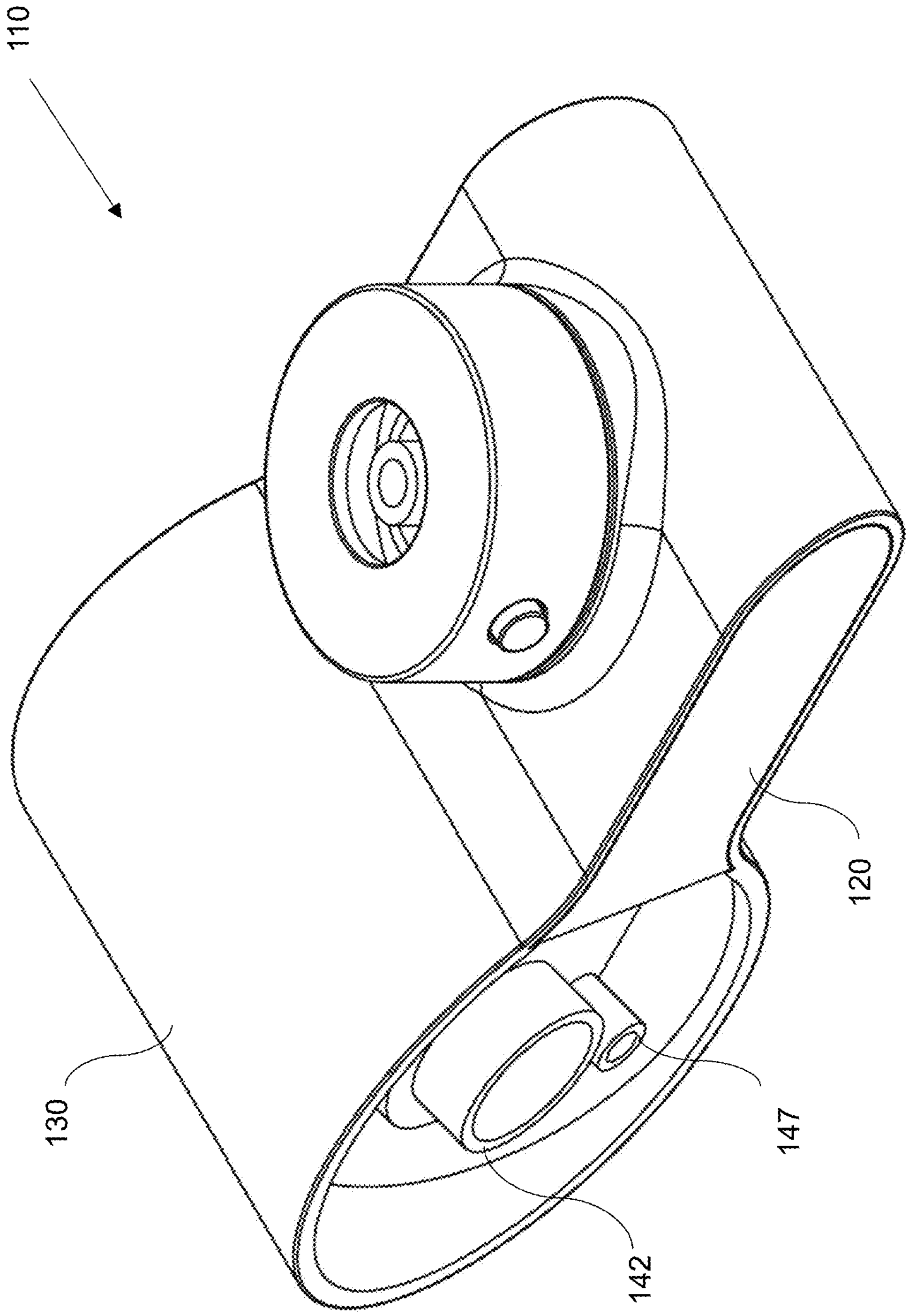
FIG. 19 is a first perspective view of the main body of the water filter.
Figure 20:
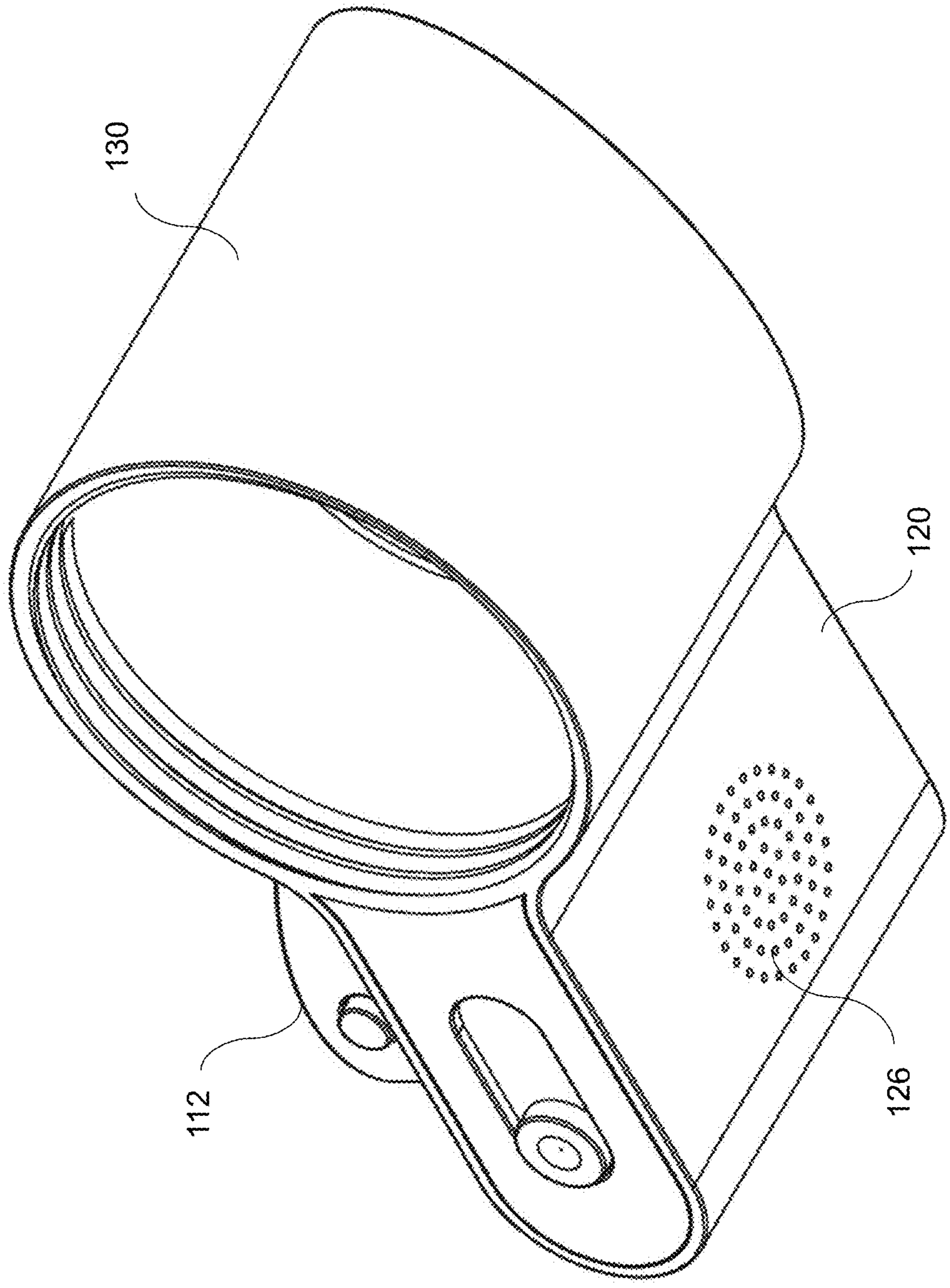
FIG. 20 is a second perspective view of the same as in FIG. 19.
Figure 21:
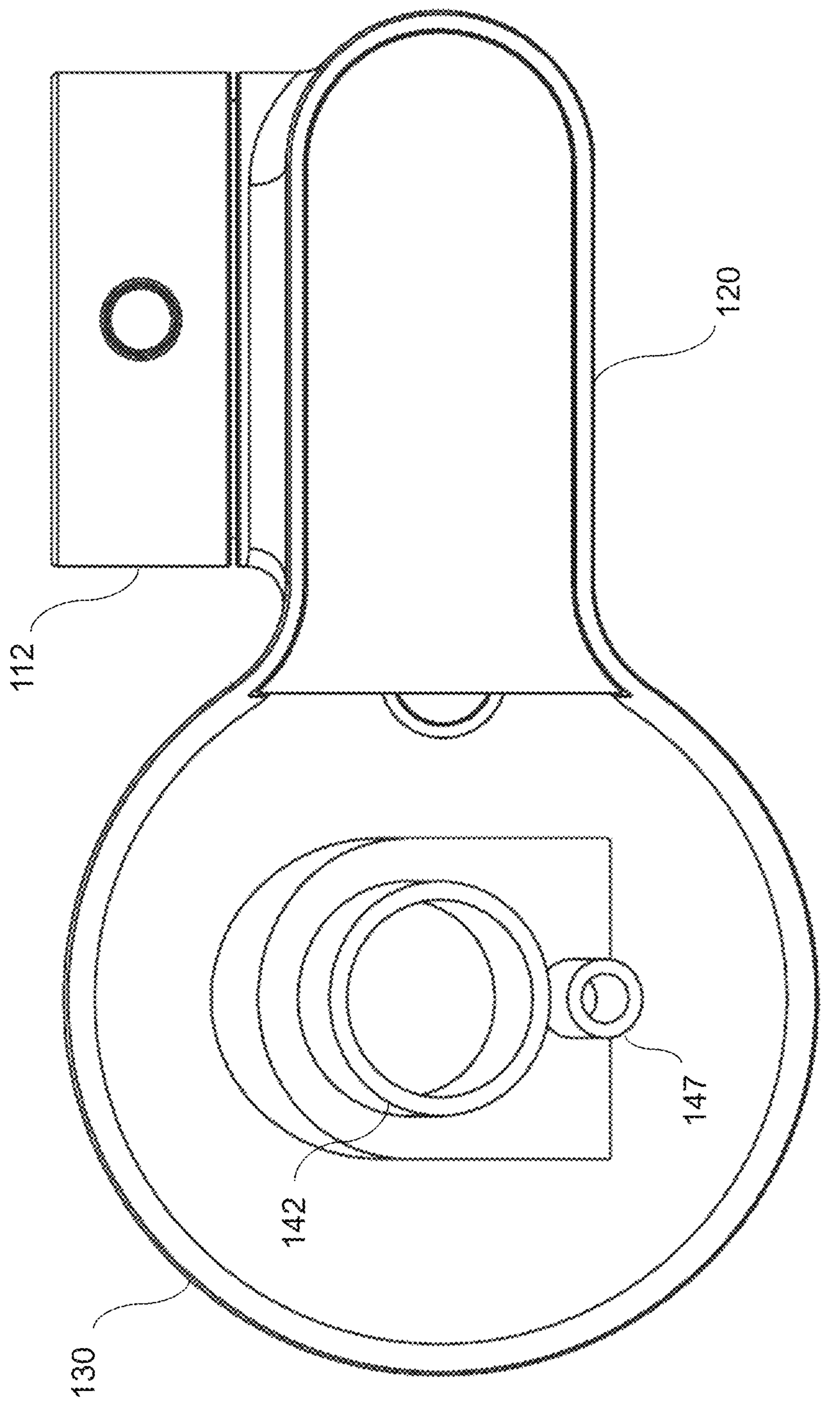
FIG. 21 is a first side view of the main body.
Figure 22:
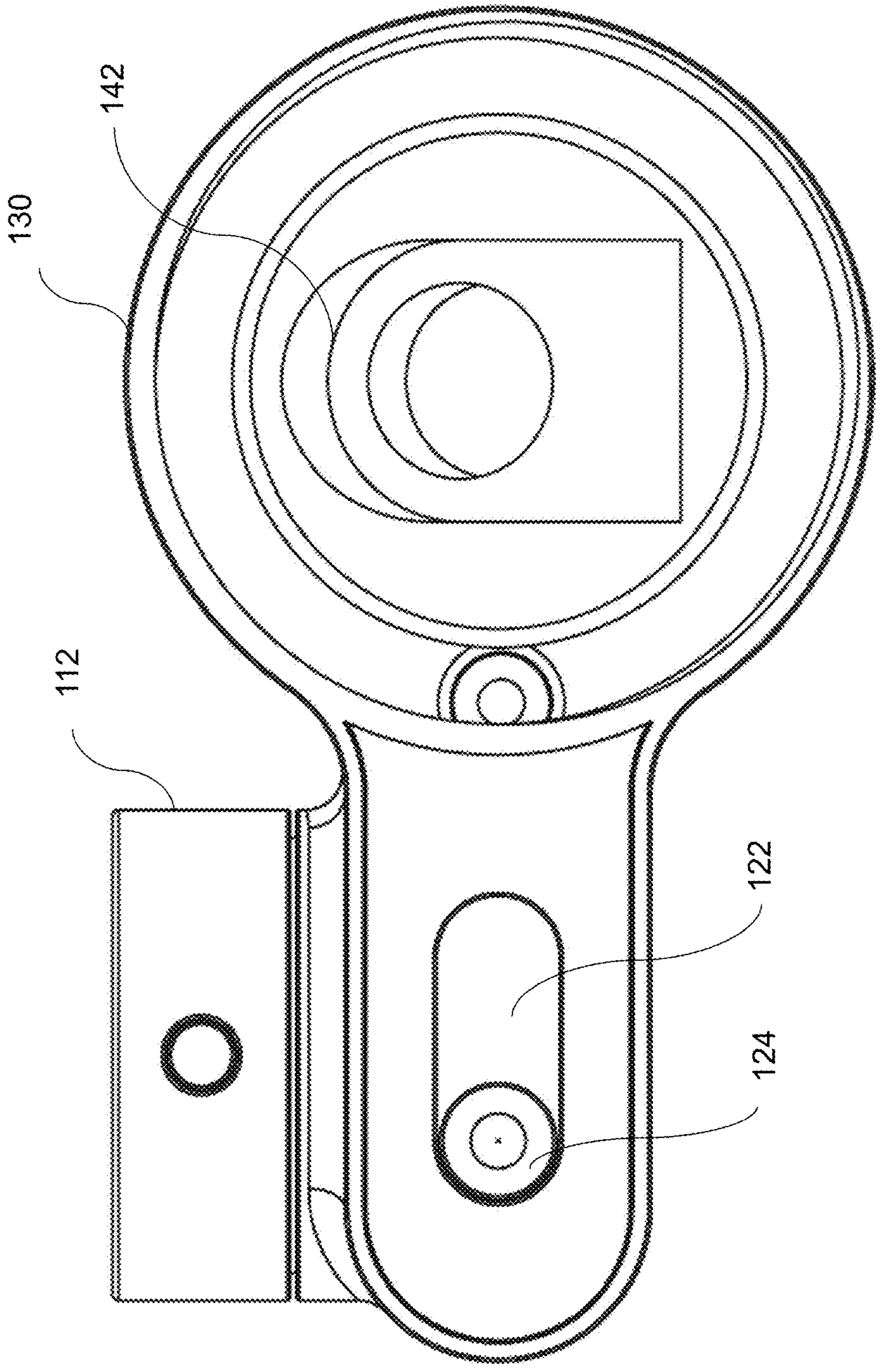
FIG. 22 is a second side view from the opposite side to that shown in FIG. 21.
Figure 24:
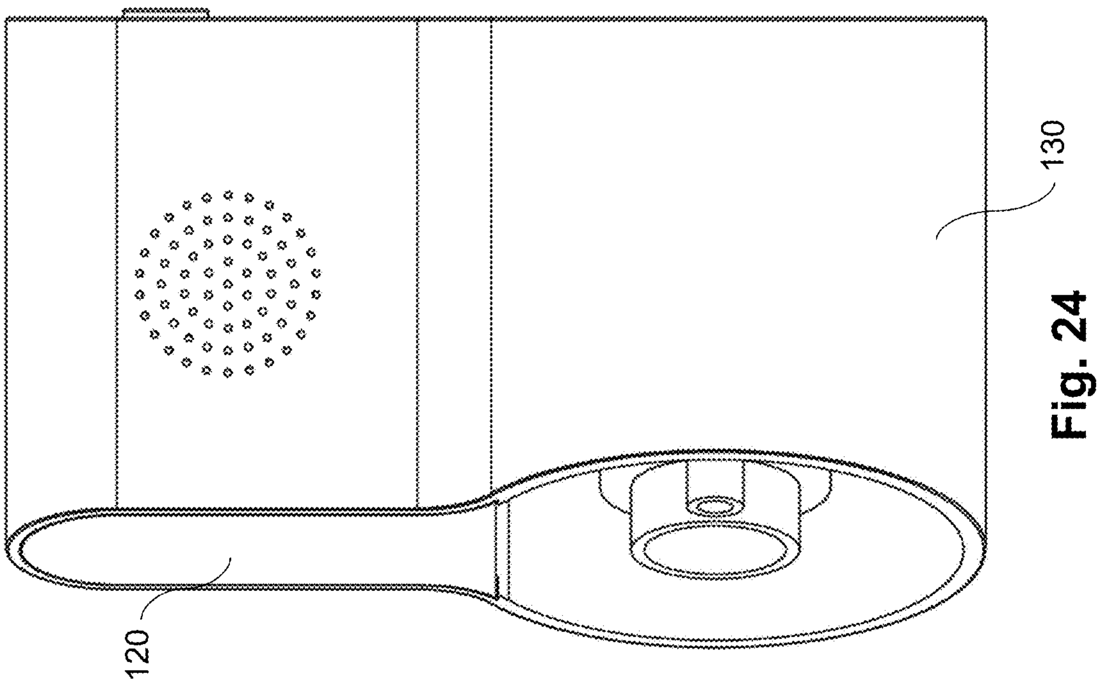
FIG. 24 is a bottom view of the main body.
Figure 23:
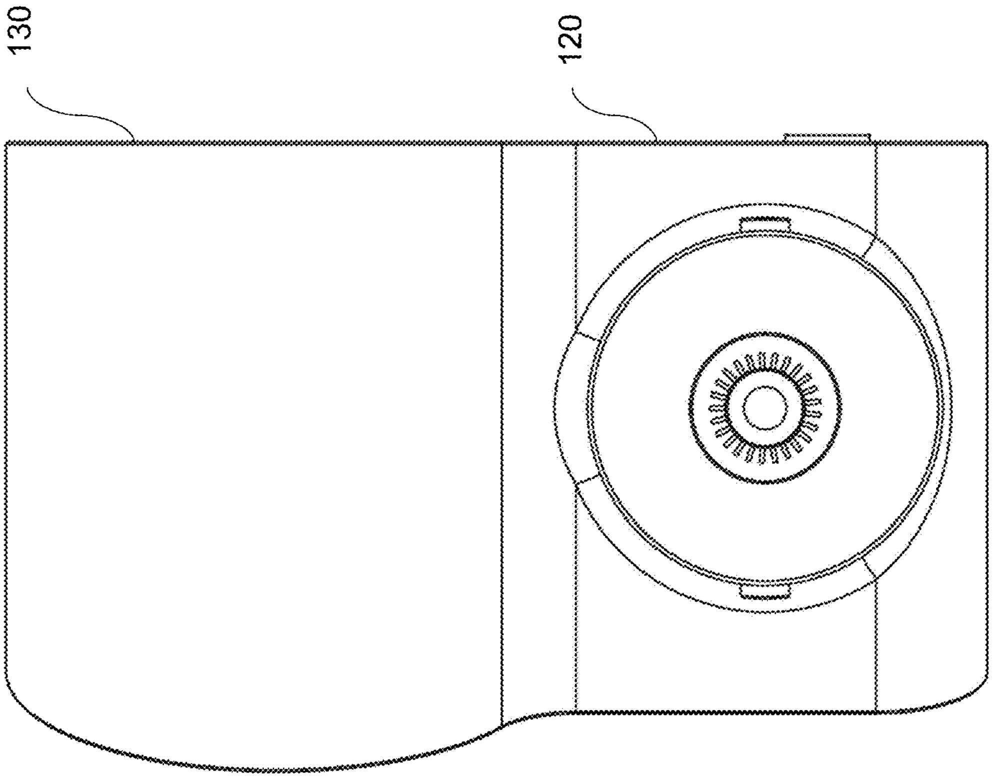
FIG. 23 is a top view of the main body.
Figure 25:
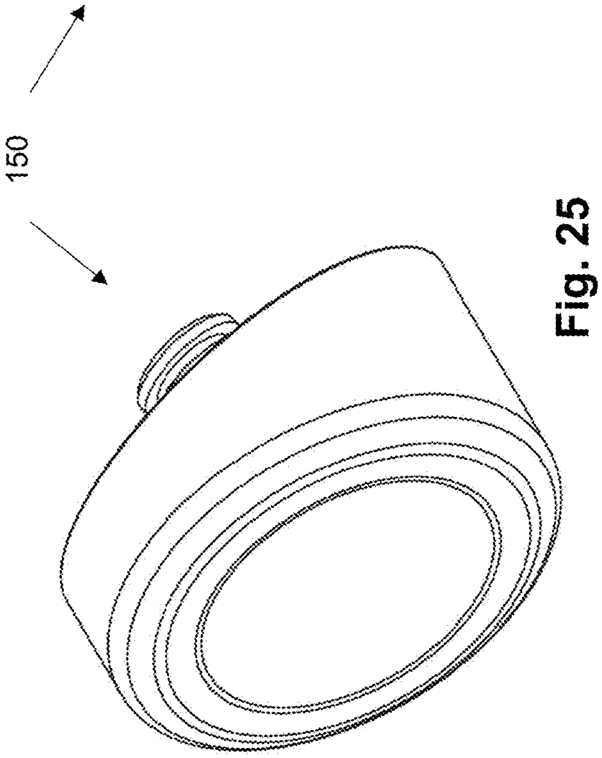
FIG. 25 is a first perspective view of the outlet body of the water filter.
Figure 26:
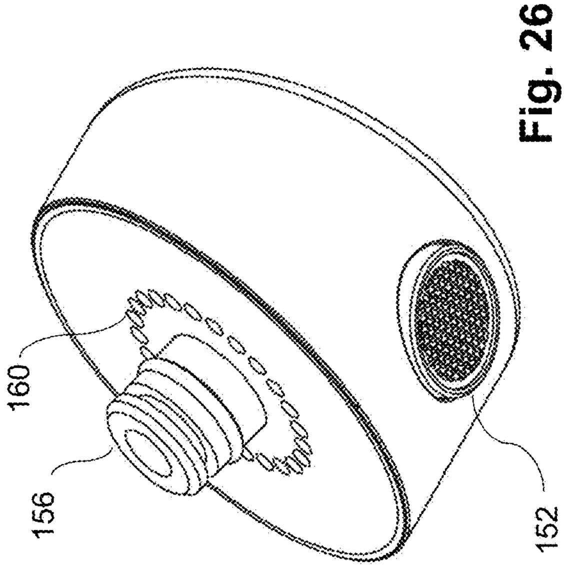
FIG. 26 is a second perspective view of the same as in FIG. 25.
Figure 27:
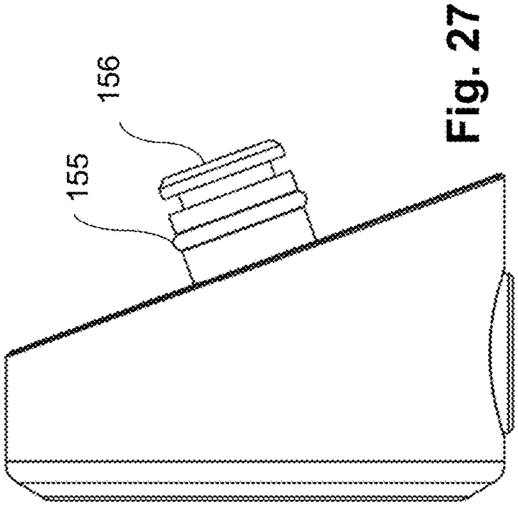
FIG. 27 is a side view of the same as in FIG. 25.
Figure 28:
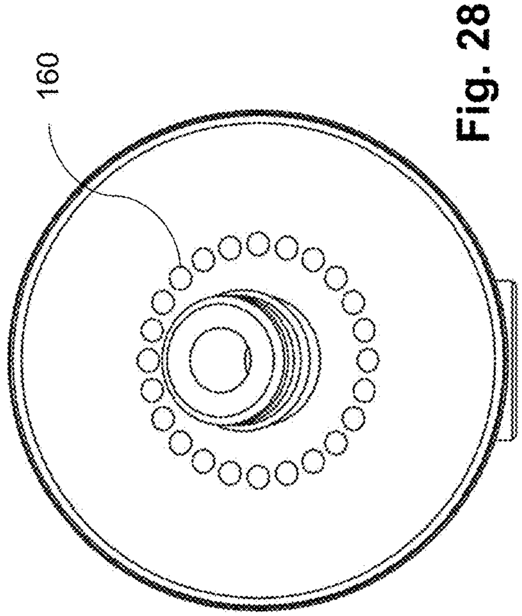
FIG. 28 is a front view of the same as in FIG. 25.

The cylindrical outlet body 150 may further feature an outlet wall 140 positioned at the same inclination angle α as the planar edge 140 of the second end 136 and be adjacent thereto. The outlet wall 140 may be configured to cooperate with the detent assembly 170 positioned in the well 147 next to the body water passage 142—see FIGS. 11 and 19.

The detent assembly 170 may include a spring 172 and at least one ball 174. Two balls 174 are seen in the example of the water filter 100 design shown in the drawings. The outer ball 174 may be configured to partially engage with the outlet wall 140 via one of the plurality of indentations 160, each made to match the size of the ball 174. Indentations 160 may be positioned radially around the axial line 144, for example, every 10 to 15 degrees. Once the spring-loaded ball 174 is engaged with the outer wall 140, the outlet body 150 is prevented from free rotation around the axial line 144. The spring 172 may be selected to allow a user to turn the outlet body 150 so that the ball 174 is engaged with another indentation 160 along the circle formed by the plurality of indentations 160. This allows the user to select and retain the outlet body 150 in the desired position.

Figure 14:
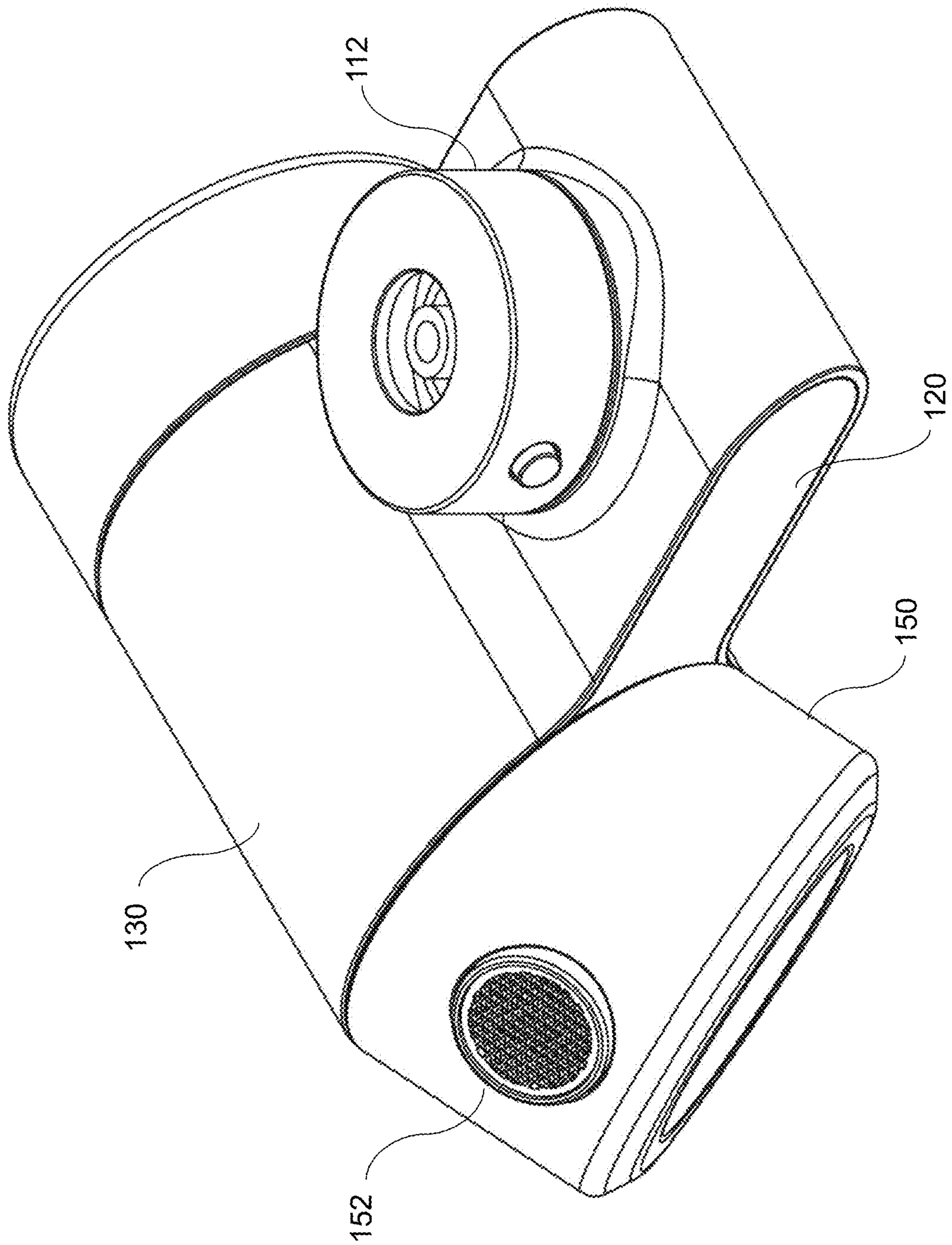
FIG. 14 is a perspective view of the same with the filtered water outlet directed up.
Figure 15:
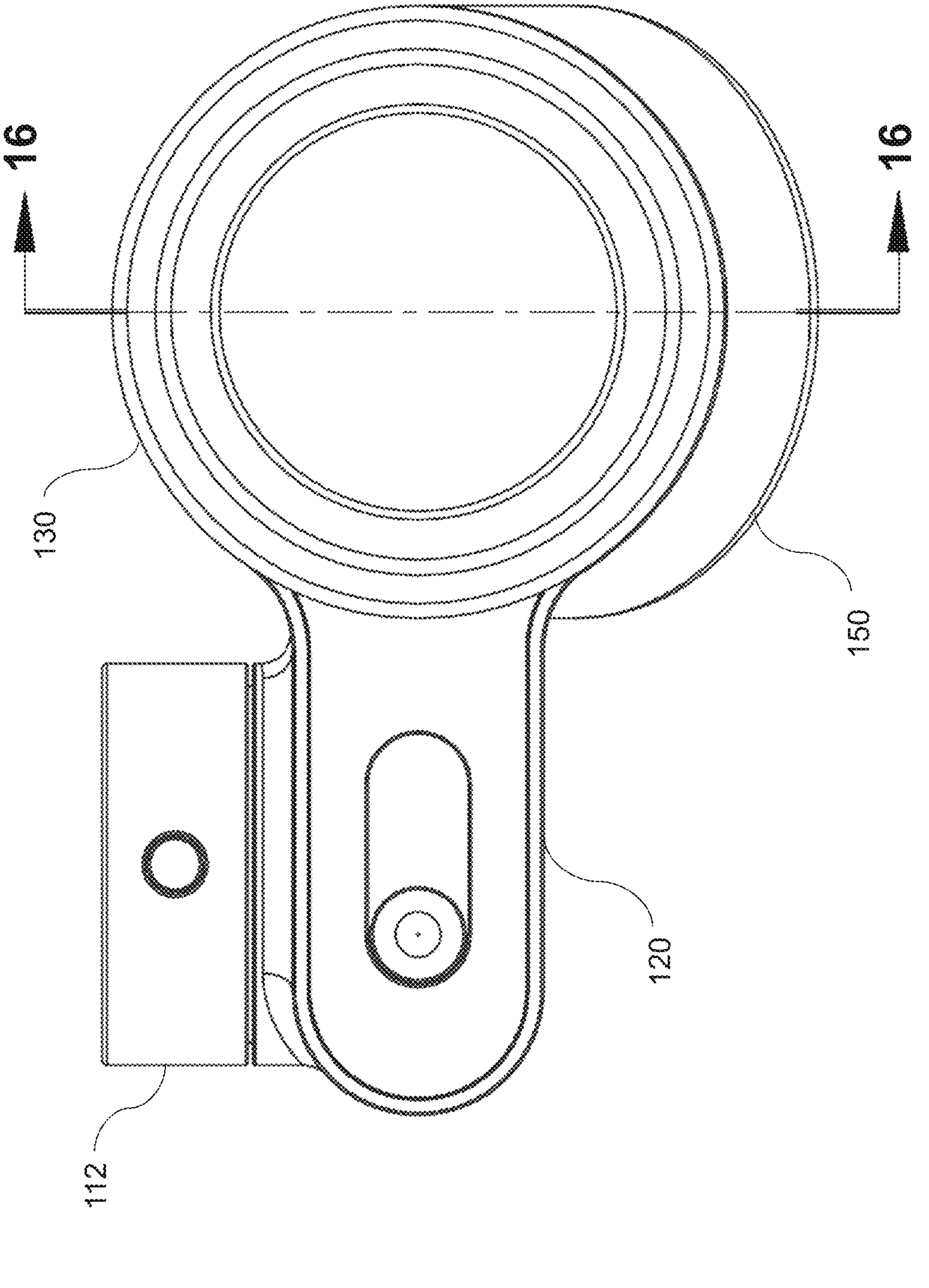
FIG. 15 is a side view of the same as in FIG. 14.
Figure 16:
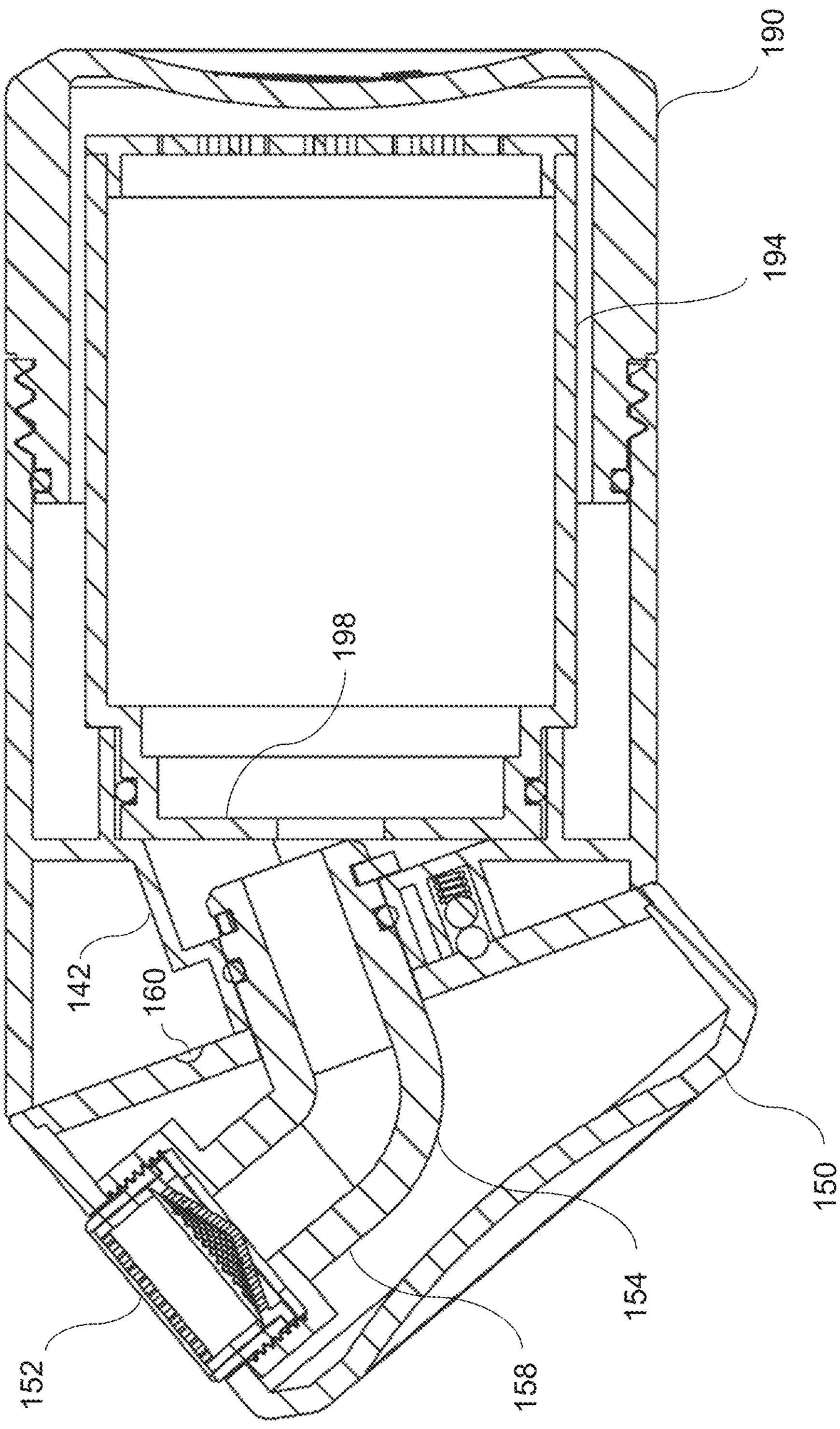
FIG. 16 is a cross-sectional view of the same as in FIG. 14.
Figure 18:
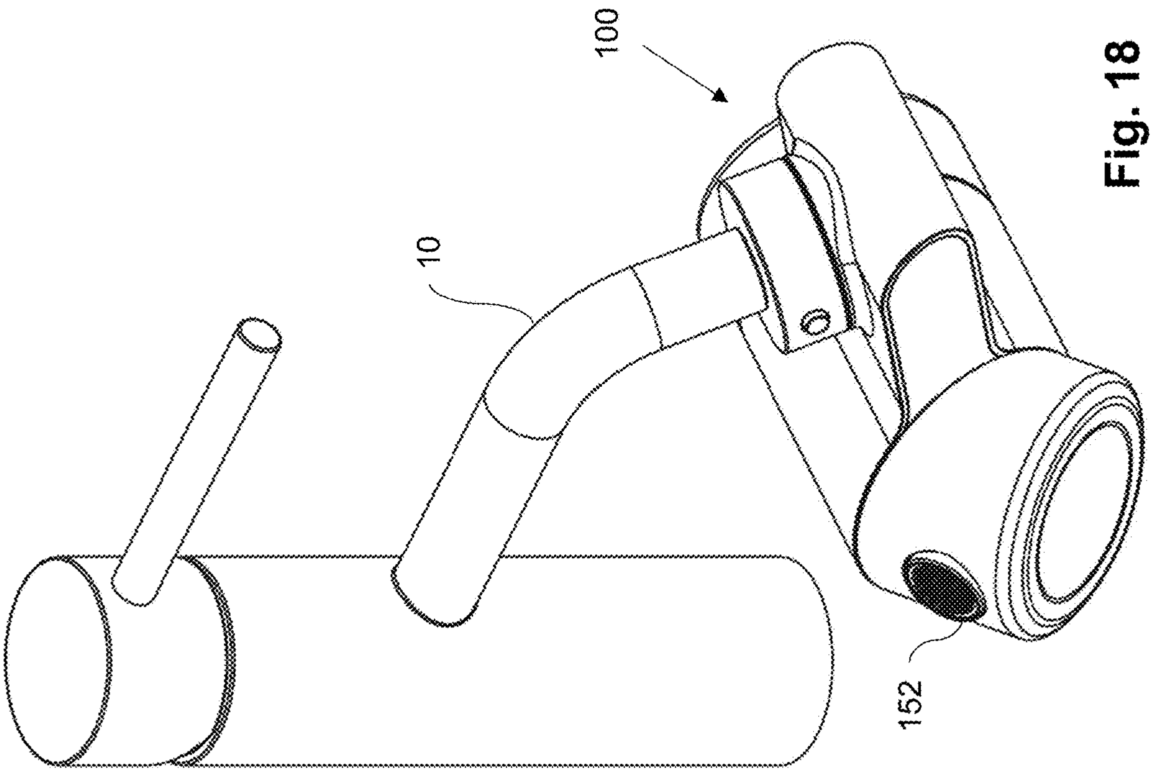
FIG. 18 is a second perspective view of the water filter in use on a kitchen faucet, with the filtered water outlet directed up.
Figure 17:
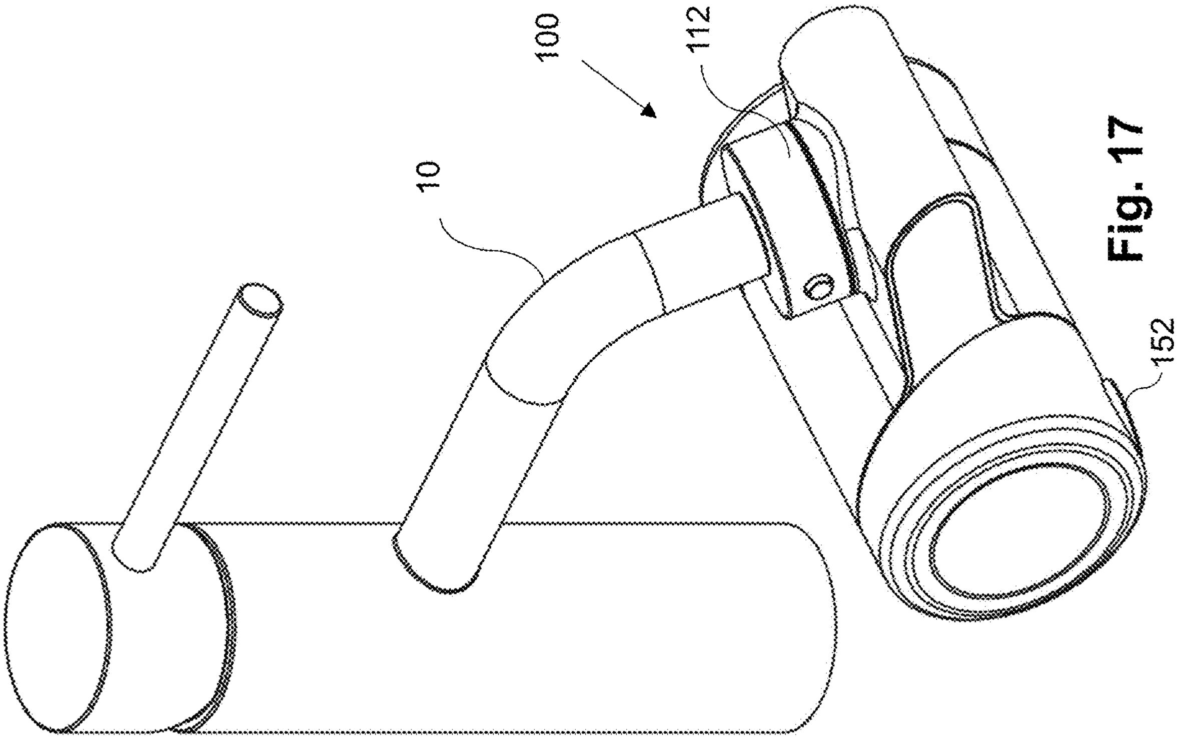
FIG. 17 is a first perspective view of the water filter in use on a kitchen faucet with the filtered water outlet directed downward.

FIGS. 14-16 show the water filter 100 with the outlet body 150 rotated to orient the filtered water outlet 152 to face up. Two orientations of the outlet body 150 are seen in FIGS. 17 and 18 showing the water filter of the invention 100 mounted on a faucet 10. FIG. 17 shows the filtered water outlet 152 facing down while FIG. 18 shows it facing up.

Finally, FIGS. 19-24 show the details of the main body 110 of the water filter 100, while FIGS. 25-28 show the details of outlet body 150, discussed above.

All rigid components of the water filter 100 may be made from suitable plastic or metal materials as known in the art.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic (s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A faucet-mounted water filter with adjustable filtered water stream direction, the water filter comprising:

a main body comprising:

a horizontally elongated cylindrical portion comprising an internal cylindrical cavity extending therein and sized to removably accept an elongated replaceable cylindrical water filter cartridge therein, the cylindrical portion defining a first end and a second end longitudinally opposed to the first end, an endcap removably attachable to the first end of the cylindrical portion and configured to secure and seal off the water filter cartridge therein, an extension portion extending from a side of the cylindrical portion, the extension portion, in turn, comprising:

a faucet attachment adapter configured to removably attach the faucet-mounted water filter to a faucet, an unfiltered water outlet located opposite the faucet attachment adapter, and a flow diverter assembly having a knob accessible from outside the extension portion, the knob is operable to select one of the following operation modes:

(i) directing water from the faucet attachment adapter to the unfiltered water outlet to bypass the water filter cartridge, or (ii) directing water from the faucet attachment adapter toward the cylindrical portion to facilitate water filtration using the water filter cartridge, wherein the second end of the cylindrical body defining a planar edge positioned at an inclination angle to a longitudinal axis of the cylindrical portion, wherein the second end comprising a body water passage with a center line extending from the internal cylindrical cavity orthogonally to the planar edge of the second end, and a cylindrical outlet body shaped as and positioned as an extension of the cylindrical portion of the main body, the outlet body having an outlet wall positioned at the same inclination angle as and adjacent to the planar edge of the second end of the cylindrical portion, the outlet body comprising a filtered water outlet extending from a cylindrical side wall thereof, the outlet body is rotatably and sealingly mounted on the body water passage of the cylindrical portion via a curved outlet water passage operably extending through the outlet body and toward the filtered water outlet, thereby facilitating filtered water to exit therethrough the outlet body at the side wall thereof, wherein rotation of the outlet body about an axis of rotation coinciding with the central line of the body water passage causes a change in a filtered water stream direction.

2. The water filter as in claim 1, wherein the inclination angle of the planar edge is selected to be at or above 45 degrees and less than 90 degrees.

3. The water filter as in claim 1, further comprising a detent assembly configured to retain the outlet body in the selected orientation.

4. The water filter as in claim 2, wherein the detent assembly comprises a spring-loaded ball configured to cooperate with one of a plurality of indentations positioned on an outlet wall in a circle around the body water passage.

5. The water filter as in claim 1, wherein the curved outlet water passage comprises a first part and a second part tilted with respect to the first part.

6. The water filter as in claim 5, wherein the tilt angle is selected to be from more than 90 degrees to less than 135 degrees.

7. The water filter as in claim 6, wherein the sum of the inclination angle and the tilt angle is selected to be 180 degrees so that the filtered water outlet faces vertically down when the outlet body is rotated to position the filtered water outlet in its lowest position.

8. A faucet-mounted water filter with adjustable filtered water stream direction, the water filter comprising:

a main body comprising:

a horizontally elongated portion comprising an internal cylindrical cavity extending therein and sized to removably accept an elongated replaceable cylindrical water filter cartridge therein, the horizontally elongated portion defining a first end and a second end longitudinally opposed to the first end, wherein the second end of the elongated portion defining a planar edge, a body water passage extending from the horizontally elongated portion orthogonally to the planar edge of the second end, and an extension portion extending from a side of the horizontally elongated portion, the extension portion, in turn, comprising a faucet attachment adapter configured to removably attach the faucet-mounted water filter to a faucet, an outlet body shaped as and positioned as an extension of the horizontally elongated portion of the main body, the outlet body having an outlet wall positioned adjacent to the planar edge of the second end of the horizontally elongated portion, the outlet body comprising a filtered water outlet extending from a side wall thereof, the outlet body is rotatably and sealingly mounted on the body water passage, the outlet body further comprises a curved outlet water passage operably extending through the outlet body to facilitate a flow of water from the body water passage to the filtered water outlet, thereby facilitating filtered water to exit therethrough the outlet body at the side wall thereof, wherein rotation of the outlet body about an axis of rotation coinciding with the central line of the body water passage causes a change in a filtered water stream direction.

9. The faucet-mounted water filter with adjustable filtered water stream direction, as in claim 8, wherein the extension portion extends from the side of the horizontally elongated portion between the first end and the second end.

10. The faucet-mounted water filter with adjustable filtered water stream direction, as in claim 8, wherein the body water passage extends from the internal cylindrical cavity.

11. The faucet-mounted water filter with adjustable filtered water stream direction, as in claim 8, wherein the outlet wall of the outlet body is rotatably cooperating with the planar edge of the second end of the horizontally elongated portion.

12. The faucet-mounted water filter with adjustable filtered water stream direction, as in claim 8, wherein rotation of the outlet body facilitates a change of the filtered water stream direction from a vertically down direction to a horizontal direction.

13. The faucet-mounted water filter with adjustable filtered water stream direction, as in claim 8, wherein the main body is configured to be open on one side thereof to facilitate removal and replacement of the elongated replaceable cylindrical water filter cartridge.

* * * * *